US011790361B2

(12) United States Patent
Gaddam et al.

(10) Patent No.: US 11,790,361 B2
(45) Date of Patent: Oct. 17, 2023

(54) SMART DEVICE SYSTEM AND METHOD OF USE

(71) Applicant: Visa International Service Association, San Francisco, CA (US)

(72) Inventors: Sivanarayana Gaddam, San Francisco, CA (US); Hao Yang, San Jose, CA (US); Atul Luykx, San Francisco, CA (US); Andreas Aabye, San Mateo, CA (US); Simon Hurry, San Francisco, CA (US); Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 340 days.

(21) Appl. No.: 17/044,742

(22) PCT Filed: Apr. 5, 2019

(86) PCT No.: PCT/US2019/025987
§ 371 (c)(1),
(2) Date: Oct. 1, 2020

(87) PCT Pub. No.: WO2019/195676
PCT Pub. Date: Oct. 10, 2019

(65) Prior Publication Data
US 2021/0158350 A1 May 27, 2021

Related U.S. Application Data

(60) Provisional application No. 62/653,384, filed on Apr. 5, 2018.

(51) Int. Cl.
*G06Q 20/40* (2012.01)
*G06Q 20/32* (2012.01)
*G06Q 20/38* (2012.01)

(52) U.S. Cl.
CPC .......... *G06Q 20/401* (2013.01); *G06Q 20/32* (2013.01); *G06Q 20/3278* (2013.01); *G06Q 20/38* (2013.01); *G06Q 2220/00* (2013.01)

(58) Field of Classification Search
CPC ............ G06Q 20/401; G06Q 20/3278; G06Q 2220/00
See application file for complete search history.

(56) References Cited

U.S. PATENT DOCUMENTS 10,361,856 B2 * 7/2019 Cassin .................. H04L 9/3213
2009/0300017 A1   12/2009 Tokusho et al.
(Continued)

OTHER PUBLICATIONS

Horwedel, M., EMV 101: Smart chip technology expands in the U.S., 2016, Franchising World, (Year: 2016).*
(Continued)

*Primary Examiner* — Matthew L Hamilton
(74) *Attorney, Agent, or Firm* — Kilpatrick Townsend & Stockton LLP

(57) ABSTRACT

A smart device is provided between a transaction terminal (e.g. an access device, a point of sale terminal) and a payment card to facilitate a secure transaction. The smart device receives transaction details from the transaction terminal. The transaction terminal suspends the transaction. The smart device is brought in communication with a payment device in control of the user (e.g. the user of the payment device does not hand over the payment device to a merchant, clerk, waitstaff). The smart device receives a cryptogram identifying an account from the payment device and transmits the cryptogram to the transaction terminal. The transaction terminal resumes the transaction, generates a transaction authorization request message including the cryptogram, and transmits the transaction authorization request message to an issuer of the account. The transaction (Continued)

PREVIOUS PAYMENT WORKFLOW

902

SMART DEVICE PAYMENT WORKFLOW

904 terminal receives an authorization response message from the issuer, and notifies the smart device of the transaction being approved or declined.

15 Claims, 14 Drawing Sheets

(56) References Cited

U.S. PATENT DOCUMENTS

| | | | |
|---|---|---|---|
| 2012/0066079 A1 | 3/2012 | Falzone et al. | |
| 2013/0144731 A1 | 6/2013 | Baldwin et al. | |
| 2013/0339247 A1* | 12/2013 | Lam | G06Q 20/4016 |
| | | | 705/44 |
| 2014/0358790 A1 | 12/2014 | Koichi et al. | |
| 2016/0055474 A1* | 2/2016 | Syed | H04W 4/029 |
| | | | 705/39 |
| 2017/0004497 A1 | 1/2017 | Mestré et al. | |
| 2017/0236125 A1* | 8/2017 | Guise | H04W 12/12 |
| | | | 705/17 |
| 2017/0308899 A1* | 10/2017 | Smets | G06Q 20/20 |
| 2021/0342835 A1* | 11/2021 | Hayhow | G06Q 20/3823 |

OTHER PUBLICATIONS

Application No. PCT/US2019/025987, International Search Report and Written Opinion, dated Jul. 25, 2019, 15 pages.

\* cited by examiner

PREVIOUS PAYMENT WORKFLOW

SMART DEVICE PAYMENT WORKFLOW

SMART DEVICE SYSTEM AND METHOD OF USE

CROSS-REFERENCES TO RELATED APPLICATIONS

This application is a National Stage of International Application No. PCT/US2019/025987, filed on Apr. 5, 2019, which claims the benefit of and priority to U.S. Provisional Application No. 62/653,384, filed Apr. 5, 2018 the entire contents of which are incorporated herein by reference for all purposes.

BACKGROUND

Magnetic stripe based credit/debit cards are extremely convenient to use, but have been heavily abused by malicious actors over decades. The fraud is further exacerbated by the rise of e-commerce. Malicious actors launch card skimming attacks in brick and mortar stores as well as in the e-commerce setting. The stolen card details are also being sold in black markets.

Chip cards were introduced in 2015 to address the counterfeit fraud in brick and mortar stores. There has been a 58% drop in counterfeit fraud during the same time frame. This significant drop suggests that the chip cards are effective in eliminating the counterfeit fraud.

However, recent reports suggest that the chip cards may lead to an increase in card not present (CNP) transaction fraud. Attackers have shifted their focus to fraud in the e-commerce setting. A leading cause of CNP transaction fraud is due to credit card information theft. There are several avenues where attackers can acquire payment credentials: 1) data breaches, for example, the Equifax breach in 2017 caused a 300%-600% increase in e-commerce fraud; and 2) restaurant ruse, for example, a malicious waiter or owner can capture payment credentials by skimming or other means. In the restaurant setting, one can assume that the card already has been compromised since the card is not in control of the consumer for a few minutes.

According to processing network reports, about 40% of all credit card information theft may be traced back to restaurants. Two leading causes of stealing credit card information may be tracked backed to (1) attackers stealing credit card information (for cards with a magnetic stripe) by compromising restaurant computer systems; and (2) malicious waitstaff stealing information printed on the cards.

Consumers trust waitstaff to pay after dining. Consumers often have to wait for a bill, place their payment card in a folder, wait for a payment receipt and the card, sign the receipt, and leave. The current payment workflow is time consuming and risky, since malicious waitstaff could easily skim payment credentials when the card is in their control. Increase in chip card transactions makes this workflow more attractive by incentivizing waitstaff to launch skimming and relay attacks. Current solutions include a "pay first to dine" method or a "pay at the table with a point of sale" method. These solutions are expensive for the merchant to implement and/or require a change in the consumer behavior.

Embodiments of the invention address these and other problems individually and collectively.

BRIEF SUMMARY

Embodiments of the invention is related to a method comprising receiving, by a smart device, a first message including data associated with a transaction from an access device. The smart device stores the data associated with the transaction, wherein the access device suspends the transaction. The method further includes initiating communication, by the smart device with a portable device. The portable device transmits the data associated with the transaction to the portable device. The portable device receives a second message including a cryptogram from the portable device. The method may also include transmitting, by the smart device, a third message including the cryptogram to the access device to resume the transaction. In some embodiments, data in at least one of the first message, the second message and the third message may be exchanged in a plurality of messages. According to some embodiments, the smart device is a smart folder including a secure element and a pocket configured to receive the portable device. In various embodiments, information is exchanged between the access device and the portable device only through the smart device.

According to some embodiments, the method may also include storing, by the smart device, the cryptogram; and sending, by the smart device, a command to resume the transaction to the access device prior to transmitting the cryptogram to the access device. The command includes the data associated with the transaction. The smart device may receive, from the access device, an indicator indicating the transaction being authorized or declined. The smart device may delete the cryptogram upon receiving the indicator from the access device.

In some embodiments, the method may include receiving, by the smart device from the access device, an indicator indicating the transaction being authorized or declined. The smart device may activate a visual indicator based on the transaction being authorized or declined.

In some embodiments, the smart device may initiate a first communication with the access device via near field communication prior to receiving the first message including the data associated with the transaction from the access device. The smart device may initiate a second communication with the access device via the near field communication prior to transmitting the third message including the cryptogram to the access device to resume the transaction. The smart device receives the data associated with the transaction from the access device and transmits the cryptogram to the access device via the near field communication.

According to various embodiments, the smart device receives the first message including the data associated with the transaction from the access device and transmits the third message including the cryptogram to the access device via a wireless connection. In some embodiments, the smart device transmits the data associated with the transaction to the portable device and receives the cryptogram from the portable device via near field communication.

In some embodiments, the method may further include receiving, by the smart device, the portable device at a reader slot of the smart device; and activating a visual indicator after receiving the cryptogram from the portable device.

According to various embodiments, the method may also include transporting the smart device from a first position to a second position proximate to the portable device.

Another embodiments of the invention is related to a portable device to perform the above-noted method.

Other embodiments of the invention is related to a method including receiving, at a smart device, first interaction data from an access device in a first message. The method may also include temporarily storing, by the smart device, the first interaction data while waiting for an interaction with a portable device. The smart device provides the first interaction data to the portable device, after the portable device interacts with the smart device. The smart device receives second interaction data from the portable device in a second message, the second interaction data including a cryptogram encoding the first interaction data. The method also includes providing, by the smart device, the second interaction data to the access device. The access device generates and transmits an authorization request message to a transaction processing computer for authorization of a transaction. The first message and the second message are part of a set of messages used by the access device complete the transaction.

In some embodiments, the first interaction data comprises a value generated by the access device. The smart device may be in the form of a smart folder, the smart device shaped such that the smart device is independently structured from any portion of the access device. In some embodiments, the second message is wirelessly transmitted from the smart device to the access device.

According to various embodiments, the method may also include moving the smart device away from the portable device and towards the access device.

Another embodiments of the invention is related to a smart device to perform the above-noted method.

Other embodiments of the invention is related to a method including transmitting, by an access device to a smart device, a first message including data associated with a transaction. The access devices logs the transaction in a transaction log; and suspends the transaction. The method also includes receiving, by the access device from the smart device, a second message including a command to resume the transaction. The access device retrieves the transaction from the transaction log; and receives a cryptogram from the smart device. The method further includes generating, by the access device, a transaction authorization request message including the cryptogram and the data associated with the transaction. The access device transmits the transaction authorization request message to an authorizing computer. The access device receives, from the authorizing computer, a transaction authorization response message authorizing or declining the transaction.

In some embodiments, the method may also include transmitting, by the access device to the smart device, an indicator indicating the transaction being authorized or declined based on a content of the transaction authorization response message.

According to various embodiments, the method may include receiving, by the access device from the smart device, an initial communication via near field communication prior to transmitting the first message including the data associated with the transaction to the smart device. The access device transmits the data associated with the transaction to the smart device and receives the cryptogram from the smart device via the near field communication. In some embodiments, the access device transmits the first message including the data associated with the transaction to the smart device and receives the cryptogram from the smart device via a wireless connection.

In some embodiments, the access device transmits the first message including the data associated with the transaction to the smart device and receives the cryptogram from the smart device via near field communication.

In various embodiments, the method may also include transporting the smart device from a first position proximate to the access device to a second position proximate to the payment device. The access device and the payment device communicate with each other only through the smart device.

Another embodiments of the invention is related to an access device to perform the above-noted method.

Further details regarding embodiments of the invention can be found in the Detailed Description and the Figures.

DETAILED DESCRIPTION

Figure 1:
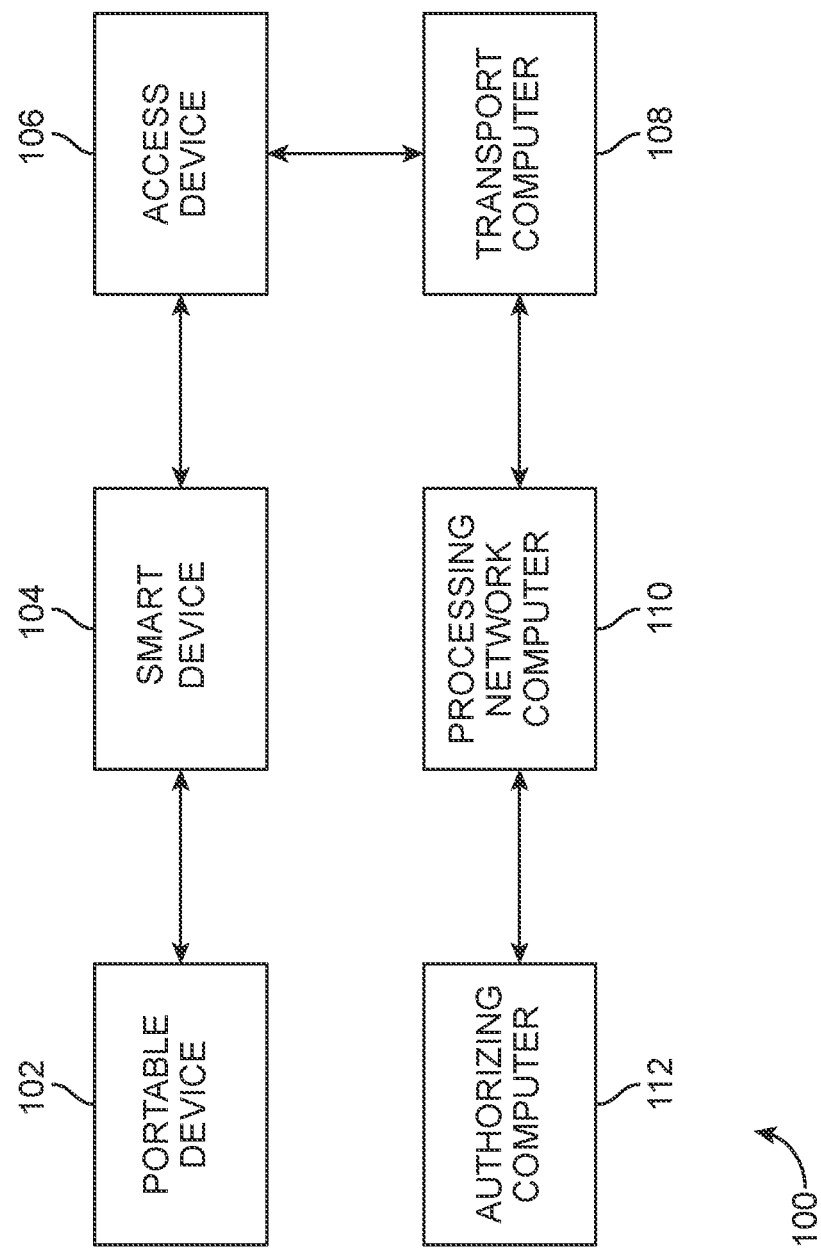
FIG. 1 shows a block diagram of a system according to embodiments of the invention.

According to various embodiments, aa smart device such as a portable device holder (e.g., a smart folder) between a transaction terminal (e.g. an access device, a point of sale terminal) and a payment device such as a payment card may facilitate a secure transaction. For example, a smart device may interact with the transaction terminal via a wireless connection, a near field communication or the like to receive transaction details from the transaction terminal. After transmitting the details of the transaction to the smart device, the transaction terminal may log (e.g. store) the transaction data at a transaction log and may suspend the transaction. The smart device may be then brought in communication with a payment device (e.g. a payment card, a user device) in control of the user (e.g. the user of the payment device does not hand over the payment device to a merchant, clerk, waitstaff). The smart device may receive a cryptogram including (in encoded form) at least an account identifier (e.g. a primary account number, a token) identifying an account from the payment device. The smart device may then transmit the cryptogram to the transaction terminal. The transaction terminal may retrieve the transaction data from the transaction log (i.e. resume the transaction), generate a transaction authorization request message including at least a value (e.g. an amount) for the transaction and the cryptogram, and may transmit the transaction authorization request message to an issuer of the account via a transport computer and/or a processing network computer. The transaction terminal may then receive a transaction authorization response message from the issuer (via the processing network computer and the transport computer), and may notify the smart device of the transaction being approved or declined. The smart device may activate a device that emits a visual signal (e.g. a light source) on the smart device to indicate to the user that the transaction has been approved (e.g. a green light) or declined (e.g. a red light). Throughout the entire transaction processing, the transaction terminal and the payment device may not communicate directly with each other. All messages between the transaction terminal and the payment device may be transported through the smart device.

According to various embodiments, the smart device may be offline with respect to the transaction terminal. In such embodiments, the smart device may communicate with the transaction terminal via near field communication (NFC). For example, a waitstaff may bring the smart device in close proximity of the transaction terminal (e.g. may tap the smart device to the transaction terminal) for the smart device to receive the transaction details from the transaction terminal. Similarly, the waitstaff may bring the smart device in close proximity of the transaction terminal (e.g. may tap the smart device to the transaction terminal) for the smart device to transmit the cryptogram to the transaction terminal.

In other embodiments, the smart device may be online with respect to the transaction terminal. In such embodiments, the smart device may communicate with the transaction terminal via a communication network (e.g. internet, a local area network, a wide area network, a metropolitan area network, a wireless network) or a Bluetooth connection (e.g. Bluetooth Low Energy (BLE)). The smart device may receive the transaction details from the transaction terminal, and may transmit the cryptogram to the transaction terminal over the communication network or the Bluetooth connection, without being in close proximity of the transaction terminal. According to some embodiments, if the smart device cannot connect to the transaction terminal directly, the smart device may route the data to the transaction terminal via one or more other smart devices (e.g. relay routing), as described in greater detail below in connection with FIG. 10B.

According to some embodiments, the smart device may have a contactless communication with the payment device. For example, the smart device may transmit data associated with the transaction to the payment device and may receive the cryptogram from the payment device via near field communication. In such embodiments, the smart device may be online or offline with respect to the transaction terminal.

In other embodiments, the smart device may have a contact communication with the payment device. For example, the smart device may include a reader slot (e.g. a pocket) for receiving the payment device (e.g. a payment card). When the payment device is inserted in the reader slot of the smart device, the smart device may transmit data associated with the transaction to the payment device and may receive the cryptogram from the payment device. In such embodiments, the smart device may be online or offline with respect to the transaction terminal.

Prior to discussing embodiments of the invention, some terms are described in further detail.

A "user" may include an individual. In some embodiments, a user may be associated with one or more personal accounts and/or user devices. An account holder, or an owner of a payment device, a portable device may be referred as a user.

A "user device" may be any suitable device that is operated by a user. Suitable user devices can communicate with external entities such as portable devices and remote server computers. Examples of user devices include mobile phones, laptop computers, desktop computers, server computers, vehicles such as automobiles, household appliances, wearable devices such as smart watches and fitness bands, etc.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers.

A "portable device" can be a device that is easily transportable. In some cases it can be hand-held and compact. For example, a portable device may fit into a user's wallet and/or pocket (e.g., pocket-sized). Some exemplary portable devices may include payment cards, smart cards, ordinary credit or debit cards (with a magnetic strip), keychain devices, etc. Other examples of portable devices include cellular phones, personal digital assistants (PDAs), pagers, payment cards, security cards, access cards, smart media, transponders, vehicles (e.g., cars, boats, motorcycles, etc.), wearable devices (e.g., smart watch, smart jewelry, smart clothing, etc.) and the like. The portable devices can also be debit devices (e.g., a debit card), credit devices (e.g., a credit card), or stored value devices (e.g., a stored value card).

A memory in a portable device may store any suitable information. Suitable information may include access data such as financial information, which may include information such as bank account information, bank identification number (BIN), credit or debit card account number information (PAN), token, expiration dates, consumer information such as name, date of birth, etc. Information in the memory may also be in the form of data tracks that are traditionally associated with credits cards. Such tracks include Track 1 and Track 2.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "issuer" may typically refer to a business entity (e.g., a bank) that maintains an account for a user. An issuer may also issue payment credentials stored on a user device, such as a cellular telephone, smart card, tablet, or laptop to the consumer.

A "resource provider" may be an entity that can provide a resource such as a good, service, data, etc. to a requesting entity. Examples of resource providers may include merchants, governmental entities that can provide access to data, data warehouses, entities that can provide access to restricted locations (e.g., train station operators), etc. In some embodiments, resource providers may be associated with one or more physical locations (e.g., supermarkets, malls, stores, restaurants, etc.) and online platforms (e.g., e-commerce websites, online companies, etc.). In some embodiments, resource providers may make physical items (e.g., food, goods, products, etc.) available to the user. In other embodiments, resource providers may make digital resources (e.g., electronic documents, electronic files, etc.) available to the user. In other embodiments, resource providers may manage access to certain services or data (e.g., a digital wallet provider).

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, and the like. In some embodiments, an access device can be a device that acts as a payment terminal or a transaction terminal in a restaurant. In a restaurant, the payment terminal may be operated by waitstaff out of view of the consumer. In some embodiments, where an access device may comprise a POS terminal, any suitable POS terminal may be used and may include a reader, a processor, and a computer-readable medium.

An access device may use any suitable contact or contactless mode of operation to send or receive data from, or associated with, a smart device, as described in connection with various embodiments. For example, access devices can have radio frequency (RF) antennas.

An "interaction" can be a reciprocal action, effect, or influence. An interaction, for example, could be an exchange or transaction between two or more parties. For example, during an interaction two or more parties may exchange data.

Examples of transactions can include payment transactions, data access transactions, and location access transactions.

An "authorizing entity" is an entity which can authorize or approve interactions. An authorizing entity may be a business entity (e.g., an issuer, or bank) that maintains an account for a user and is capable of authorizing interactions such as payment transactions for the purchase of goods or services.

An "authorization request message" may be an electronic message that requests authorization for an interaction such as a transaction. In some embodiments, it is sent to a transaction processing computer and/or an issuer of a payment card to request authorization for a transaction. An authorization request message, according to some embodiments, may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. point of sale equipment) that indicates approval of the transaction. The code may serve as proof of authorization.

A "transaction processing computer" may be a network computer that processes transactions. In some embodiments, a transaction processing computer may include data processing subsystems, networks, and operations used to support and deliver authorization services, exception file services, and clearing and settlement services. An transaction processing computer network may include VisaNet™. Transaction processing networks such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The transaction processing computer may include a server computer. transaction processing computer may use any suitable wired or wireless network, including the internet.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of payment credentials may include a PAN (primary account number or "account number"), user name, expiration date, and verification values such as CVV, dCVV, CVV2, dCVV2, and CVC3 values.

"Access data" may include any suitable data that can be used to access a resource or create data that can access a resource. In some embodiments, "access data" may include credentials such as payment credentials. In some embodiments, access data may be account information for a payment account. Account information may include a PAN, payment token, expiration date, verification values (e.g., CVV, CVV2, dCVV, dCVV2), etc. In other embodiments, access data could include data that can be used to access a location. Such information may be ticket information for an event, data to access a building, transit ticket information, etc.

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. A cryptogram according to various embodiments may contain data such as account identifying data and/or account holder identifying data in an encrypted form.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "smart device" may be any suitable device that can receive data from and send data to other devices. For example, a smart device may communicate with an access device and with a payment device. For example, smart devices can have card readers that can include electrical contacts, radio frequency (RF) antennas, optical scanners, bar code readers, or magnetic stripe readers to interact with portable devices such as payment cards. In addition, smart devices may include contactless or contact elements to communicate with an access device. A smart device may be in form of a smart folder or a portable device holder that is configured to hold a portable device. The smart device may be shaped to be independently structured from any portion of an access device, as illustrated in and described in connection with FIGS. 2A-2B.

"Interaction data" may include any suitable data that facilitates an interaction between two devices. For example, "first" interaction data may include data transmitted from an access device to a smart device. The data may include values generated by the access device such as details of a transaction. For example, the transaction may be a payment transaction to collect payment from a consumer for a service provided by a merchant (e.g. a restaurant). The first interaction data may include an amount for the transaction, an identifier for the transaction, an identifier for the consumer, a table number at the restaurant. The first interaction data may be transmitted in a message exchanged between the devices via a wireless connection, a wired connection, or a contact connection. In another example, "second interaction data" may include data transmitted from a portable device to a smart device. The data may include sensitive data stored at the portable device. For example, the portable device may be a payment device and the second interaction data may include a cryptogram encoding payment data (e.g. an account identified) stored in the payment device. The cryptogram may also include data associated with a transaction. For example, the transaction may be a payment transaction to collect payment from a consumer (e.g. holder of the portable device) for a service provided by a merchant (e.g. a restaurant). The second data may also include, in addition to the payment data, an amount for the transaction, an identifier for the transaction, an identifier for the consumer, a table number at the restaurant. The second interaction data may be transmitted in a message exchanged between the devices via a wireless connection, a wired connection, or a contact connection.

Details of some embodiments of the present invention will now be described.

FIG. 1 shows a system 100 according to an embodiment of the invention. The system 100 comprises a portable device 102, a smart device (e.g. a smart folder, a portable device holder) 104, an access device 106, a transport computer 108, a processing network computer 110, and an authorizing computer 112. In some embodiments, the system may be used in connection with collecting payment from a consumer at a merchant, such as a restaurant. For simplicity of illustration, a certain number of components are shown in FIG. 1. It is understood, however, that embodiments of the invention may include more or less components than what is illustrated, as well as more than one of each component.

The smart device 104 may be a device used by the merchant to collect payment from the consumer. The smart device 104 may be capable of processing transactions by suspending and resuming a transaction as necessary. Specifically, the smart device 104 may initiate, suspend and resume an interaction with the access device 106 using wireless, or near field communication (NFC). The interaction may include receiving a first message, by the smart device 104 from the access device 106. The access device 106 may be a point of sale (POS) device. For example, the access device 106 may be a POS device at a restaurant. The message may include first interaction data including, for example, values generated by the access device 106 such as details of the transaction, an amount for the transaction, an identifier for the transaction, an identifier for the consumer (e.g. table number). The transaction may be a payment transaction to collect payment from the user for the service provided by the merchant (e.g. the restaurant). Upon transmitting the data associated with the transaction to the smart device 104 in the first message, the access device 106 may log the transaction in a transaction log, and may suspend the transaction. The access device 106 may suspend the transaction for any suitable period of time. For example, the access device 106 may suspend the transaction for a period of 30, 20, 10, or 5 minutes or less to allow the smart device 104 to complete the interaction with the access device 106. If the interaction is not completed within the period of time, then the access device 106 may delete the data for the transaction so that it does not persist in the access device 106.

In some embodiments, the smart device 104 may be offline with respect to the access device 106. The smart device 104 may be "offline" in the sense that when it is separated from the access device 106 by a predetermined distance (e.g., 10 meters) such as a distance between the consumer that has the portable device 102 and the access device 106, the smart device 104 will be unable to communicate with the access device 106. In such embodiments, the smart device 104 may be brought into operative communication with the access device 106 by bringing the smart device 104 in close proximity of the access device 106 to enable an initial communication via near field communication (NFC) between the smart device 104 and the access device 106. In other embodiments, the smart device 104 may be online with respect to the access device 106. In such embodiments, the smart device 104 may communicate with the access device 106 via a communication network (e.g., the Internet, a local area network, etc.) or a Bluetooth connection. In such embodiments, a device may be "online" in the sense that when it is separated from the access device 106 by a predetermined distance (e.g., 10 meters) such as a distance between the consumer that has the portable device 102 and the access device 106, the smart device 104 will be able to communicate with the access device 106.

According to various embodiments, the smart device 104 may temporarily store the first interaction data while waiting for an interaction with a portable device. In some embodiments, the smart device 104 may store any transaction data for a period of 30, 20, 10, or 5 minutes or less to allow the smart device 104 to complete the interaction with the access device 106. If the interaction is not completed within the period of time, then the smart device 104 may delete the data for the transaction so that it does not persist in the smart device 104.

The smart device 104 may then be brought to the user of the portable device 102. For example, the waitstaff may transport (e.g. carry) the smart device 104 to the user. The smart device may be transported from a first position to a second position proximate to the portable device 102. In some embodiments, the smart device 104 may be provided on the table where the user is seated. The portable device 102 may then interact with the smart device 104. In some embodiments, the smart device 104 may initiate communication with the portable device 102. For example, the portable device 102 may be tapped against or inserted into the smart device 104. The smart device 104 may transmit or provide the first interaction data received from the access device 106 to the portable device 102, after the portable device 102 interacts with the smart device 104. The smart device 104 may receive second interaction data from the portable device 102 in a second message.

According to various embodiments, the smart device 104 may exchange messages (including the second message) with the portable device 102 to receive the second interaction data such as sensitive data from the portable device 102. For example, the second interaction data may include a cryptogram encoding the first interaction data. The cryptogram may also include an account identifier. In some embodiments (e.g. especially when the smart device 104 is offline with respect to the access device 106), the smart device 104 may temporarily store the second interaction data including the cryptogram at a secure memory (e.g. a secure element). The smart device 104 may purge (e.g. delete) the second interaction data when the access device 106 informs the smart device 104 that the transaction is complete (e.g. authorized or declined).

The portable device 102 may include a payment device, such as a payment card. The portable device 102 may be in control of a user (e.g. the consumer) at all times. In some embodiments, the portable device 102 may be used to pay for services provided at the merchant location (e.g. the restaurant). In some embodiments, the portable device 102 and the smart device 104 may have a contact-communication capabilities. For example, the portable device 102 may be inserted into (or swiped through) the smart device 104. In other embodiments, the portable device 102 and the smart device 104 may have a contactless communication. For example, the portable device 102 and the smart device 104 may communicate via NFC. The smart device 104 may transmit the data associated with the transaction to the portable device 102 and receives the cryptogram from the portable device 102 via near field communication.

After receiving the second interaction data from the portable device 102, the smart device 104 may resume communication with the access device 106 to transmit the second interaction data received from the portable device 102 to the access device 106. For example, the smart device 104 may send a command to the access device 106 to resume the transaction prior to transmitting the cryptogram to the access device 106. The command may include an identifier for the transaction (e.g. the data associated with the transaction) so that the access device 106 may identify the correct the transaction to resume. Thereafter, the smart device 104 may transmit a third message including the cryptogram to the access device 106 to resume the transaction. In some embodiments, the data in at least one of the first message, the second message and the third message is exchanged in a plurality of messages.

In some embodiments, the smart device 104 may transmit the second interaction data to the access device 106 wirelessly via the communication network. In other embodiments, the smart device 104 may be moved away from the portable device 102 and towards the access device 106 so that the smart device 104 is brought back into NFC communication with the access device 106. The smart device 104 may transmit the second interaction data received from the portable device 102. During these interactions, the portable device 102 and the access device 106 do not communicate directly with each other, and communicate only through the smart device 104. The data sent or received by either one of the portable device 102 and the access device 106 goes through the smart device 104.

The access device 106 may generate a transaction authorization request message including the second interaction data (e.g. the cryptogram) received from the smart device 104. The access device 106 may transmit the transaction authorization request message to the transport computer 108 via a suitable communication channel. According to various embodiments, the first message and the second message may be part of a set of messages used by the access device 106 complete the transaction.

The transport computer 108 be located between (in an operational sense) the access device 106 and the processing network computer 110. The transport computer 108 may be operated by an entity such as an acquirer. An acquirer can maintain an account of any merchants (e.g., a restaurant) with which users may wish to interact. The transport computer 108 may transmit the transaction authorization request message to the processing network computer 110.

The processing network computer 110 may route or switch messages between a number of transport computers including the transport computer 108, and a number of authorizing entity computers including the authorizing computer 112. The network computer may be a processing network computer in some embodiments. The processing network computer 110 may be configured to provide authorization services, and clearing and settlement services for payment transactions. A processing network computer 110 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet.

In some embodiments, the processing network computer 110 may transmit the transaction authorization request message received from the transport computer 108 to the authorizing computer 112 via any suitable communication channel. The processing network computer 110 may further receive a transaction authorization response message from the authorizing computer 112 and may transmit the transaction authorization response message to the transport computer 108. The transport computer 108 may then transmit the transaction authorization response message to the access device 106 to finalize the transaction with the user.

According to various embodiments, the access device 106 may notify the smart device 104 that the transaction has been approved or declined. The smart device 104 may notify the user of the status of the transaction via a visual indicator (e.g. a light, a display screen) or an audio indicator (e.g. playing voice command, sounding a brief alarm tone). Upon successful transaction, the user may leave the restaurant.

The authorizing computer 112 may be configured to authorize any suitable request, including access to data, access to a location, or approval for a payment. In some embodiments, the authorizing computer 112 may be operated by an account issuer. Typically, the issuer is an entity (e.g., a bank) that issues and maintains an account of a user. The account may be a credit, debit, prepaid, or any other type of account.

The access device 106, the transport computer 108, the processing network computer 110, and the authorizing computer 112 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2A:
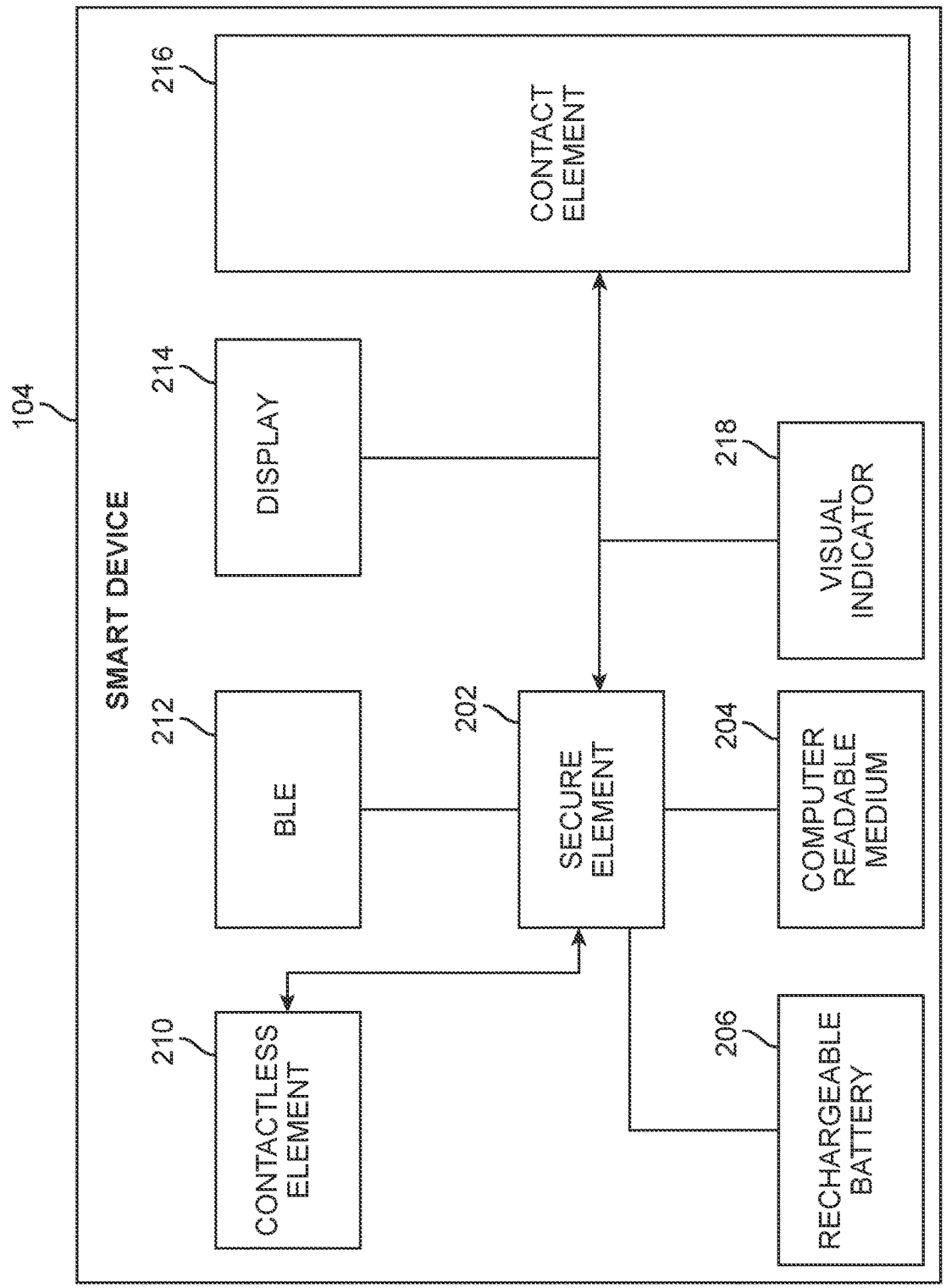
FIG. 2A shows a first block diagram of components of a smart device according to embodiments of the invention.

FIG. 2A shows a block diagram of components of a smart device (e.g. the smart device 104) according to an embodiment of the invention. The exemplary smart device 104 may comprise a secure element 202 operatively coupled to a computer readable medium 204, a rechargeable battery 206, a contactless element 210, a BLE chip 212, a display 214, a contact element 216, and a visual indicator 218.

The rechargeable battery 206 may power the smart device 104. The rechargeable battery 206 may be any suitable battery capable of powering the smart device 104. According to various embodiments, the smart device 104 may be coupled to a docking station to charge the rechargeable battery 206. In some embodiments, the smart device 104 may be plugged in to an electrical outlet to charge the rechargeable battery 206.

The secure element 202 may be a secure microprocessor chip used to store and keep data, such as secret keys or sensitive data received from the portable device 102, safe by providing various built-in security measures, such as, for example, tamper resistance, timing-channel leakage resistance, etc. In some embodiments, the secure element 202 may be a general purpose processor operable to carry out instructions on the smart device 104.

The contactless element 210 may be a NFC reader integrated circuit. In some embodiments, the NFC reader integrated circuit may be used to support payments initiated by portable devices such as contactless chip cards. The contactless element 210 may be adapted to communicate with the portable device 102 to transmit data such as access device data, and to receive data such as a cryptogram from the portable device 102, without getting in a physical contract with the portable device 102.

The BLE chip 212 may be a Bluetooth chip. The BLE chip 212 may be used to relay data or commands received from the portable device 102 to the access device 106.

The display 214 may display an amount of the transaction to the user of the portable device 102. In some embodiments, the display 214 may be a 7 segment display. The 7 segment display may display any relevant information. In some embodiments, the display 214 may display alphanumeric characters (e.g. "YES", "APPROVED", "NO, "DECLINED) or symbols (e.g. icons, emojis) that indicate the status (e.g. approved or declined status) of the transaction.

The contact element 216 may be a chip card reader. In some embodiments, the contact element 216 may be used to support payments initiated by portable devices such as chip cards through contact. The contact element 216 may be adapted to communicate with the portable device 102 to transmit data such as access device data, and to receive data such as a cryptogram from the portable device 102 when the portable device 102 is coupled to the smart device 104. In some embodiments, the contact element 216 may be a magnetic swipe reader.

The visual indicator 218 may be a light emitting diode (LED). The LED may display the status of the transaction. For example, the LED may light up green when the required information has been obtained. In some embodiments, the LED may light up red, yellow, and any other relevant color.

The visual indicator 218 may be used to visually alert the user about a progress of a transaction. For example, when the smart device 104 receives the cryptogram from the portable device 102, the visual indicator 218 may display an alert for a successful transmission, such as a green light. When the access device 106 communicates with the authorizing computer 112 (via the transport computer 108 and the processing network computer 110), the visual indicator 218 may display an alert for a transaction in progress, such as a yellow light. In some embodiments, when the transaction is authorized, the access device 106 may notify the smart device 104 and the visual indicator 218 may display an alert for transaction approval, such as a green light. In some embodiments, when the transaction is declined, the access device 106 may notify the smart device 104 and the visual indicator 218 may display an alert for transaction declined, such as a red light. According to various embodiments, the visual indicator 218 may display icons and/or alphanumeric symbols.

The computer readable medium 204 may comprise code, executable by the secure element 202. The computer readable medium 204 may contain any number of applications, modules, and code. The computer readable medium 204 may comprise code, executable by the secure element 202 for implementing a method comprising: receiving a first message including data associated with a transaction from an access device; storing the data associated with the transaction, wherein the access device suspends the transaction; initiating communication with a portable device; transmitting the data associated with the transaction to the portable device; receiving a second message including a cryptogram from the portable device; and transmitting a third message including the cryptogram to the access device to resume the transaction.

Figure 2B:
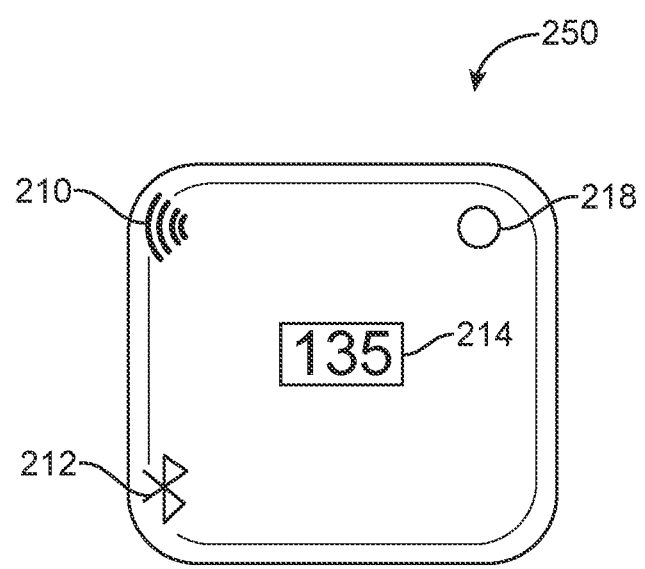
FIG. 2B shows a second block diagram of components of a smart device according to embodiments of the invention.

FIG. 2B shows an exemplary housing 250 for one or more of the components of the smart device 104. For simplicity of illustration, a certain number of components are shown in FIG. 2B. It is understood, however, that the exemplary housing 250 may include more than one of each component or may include other components. In some embodiments, the above described components may be embedded in a folder (e.g. a leather folder, a smart folder) or in a portable plastic apparatus. The folder may be made of any suitable material.

Embodiments support processing transactions between the access device 106 of a merchant and the portable device 102 of a user without the two devices being in direct communication with each other. The smart device 104 (an exemplary smart device) may be used to relay data, messages and commands between the access device 106 and the portable device 102 in a variety of settings. Next, different combination of settings will be described.

The following methods are described in reference to a transaction at a restaurant. However, embodiments of the invention are not limited to restaurant transactions and may relate to different types of merchants and locations, such as transactions at hotels.

1. Smart Device is Offline with Respect to the Access Device

According to some embodiments, the smart device 104 may be offline with respect to the access device 106. The offline mode may eliminate credential theft by removing a need to handover the portable device 102 (e.g. a payment card) to the waitstaff. Moreover, the smart device 104 may support both a contact and contactless communication with the portable device 102.

In the offline mode, the access device 106 and the smart device 104 may not know which kernel to select and initiate a payment process. In a contact mode, the access device 106 can defer this step until later, since various payment processing networks can be processed using a unified kernel. In contactless mode, each payment processing network may be processed by a unique kernel. Embodiments may be applied to contactless mode when the unified kernel is used.

Table 1, below, provides a list of tags (e.g. data transmitted in assigned data fields of transaction messages) that are transmitted by the access device 106 in both a contact mode (i.e. the smart device 104 and the portable device 102 exchange data when they are in contact with each other) and a contactless mode (i.e. the smart device 104 and the portable device 102 exchange data via NFC when they are in close proximity without being in contact). The access device 106 may provide more tags in the contact mode as opposed to the contactless mode. The tags in rows 1-15 may be the same in the contact mode and the contactless mode. The tags in rows 16-21, 23-24, 26-28, and 30-32 may be used in the contact mode but may not be used in the contactless mode. The tags in rows 22, 25, 29, and 33 may not be used in the contactless mode and may be optional in the contact mode.

TABLE 1

List of tags transmitted by the access device

| Row | PayWave Tags(Terminal) | Contact Tags(Terminal) |
|---|---|---|
| 1 | 5F2A - Transaction Currency Code | '5F2A' - Transaction Currency Code |
| 2 | 83 - Command Template | 83' - Command Template |
| 3 | 8A - Authorization Response Code (ARC) | '8A' - Authorization Response Code |
| 4 | 95 - Terminal Verification Results (TVR) | '95' - Terminal Verification Results |
| 5 | 9A - Transaction Date | '9A' - Transaction Date |
| 6 | 9C - Transaction Type | '9C' - Transaction Type |
| 7 | 9F02 - Amount, Authorized (Numeric) | '9F02' - Amount, Authorized (Numeric) |
| 8 | 9F03 - Amount, Other (Numeric) | '9F03' - Amount, Other (Numeric) |
| 9 | 9F06 - Application Identifier (AID) | '9F06' - Application Identifier (AID) |
| 10 | 9F1A - Terminal Country Code | '9F1A' - Terminal Country Code |
| 11 | 9F1B - Terminal Floor Limit | '9F1B' - Terminal Floor Limit |
| 12 | 9F22 - Certificate Authority Public Key Index (PKI) | '9F22' - Certificate Authority Public Key Index (PKI) |
| 13 | 9F37 - Unpredictable Number (Reader-Terminal) | '9F37' - Unpredictable Number (UN) |
| 14 | 9F4E - Merchant Name and Location | '9F4E' - Merchant Name and Location |
| 15 | 9F5B - Issuer Script Results | '9F5B' - Issuer Script Results |
| 16 | 9F66 - Terminal Transaction Qualifiers (TTQ) | '9F09' - Application Version Number |
| 17 | | '9F15' - Merchant Category Code |
| 18 | | '9F16' - Merchant Identifier |
| 19 | | '9B' - Transaction Status Information (TSI) |
| 20 | | '5F36' - Transaction Currency Exponent |
| 21 | | '9F1C' - Terminal Identification |
| 22 | | '9F1D' - Terminal Risk Management Data |
| 23 | | '9F1E' - Interface Device (IFD) Serial Number |
| 24 | | '9F21' - Transaction Time |
| 25 | | '9F01' - Acquirer Identifier |
| 26 | | '9F33' - Terminal Capabilities |

TABLE 1-continued

List of tags transmitted by the access device

| Row | PayWave Tags(Terminal) | Contact Tags(Terminal) |
|---|---|---|
| 27 | | '9F34' - Cardholder Verification Method (CVM) Results |
| 28 | | '9F35' - Terminal Type |
| 29 | | '98' - Transaction Certificate (TC) Hash Value |
| 30 | | '9F40' - Additional Terminal Capabilities |
| 31 | | '9F41' - Transaction Sequence Counter |
| 32 | | '99' - Transaction PIN |
| 33 | | '5F57' - Account Type |

1.1 the Smart Device Supports Contact Communication with the Portable Device

Figure 3:
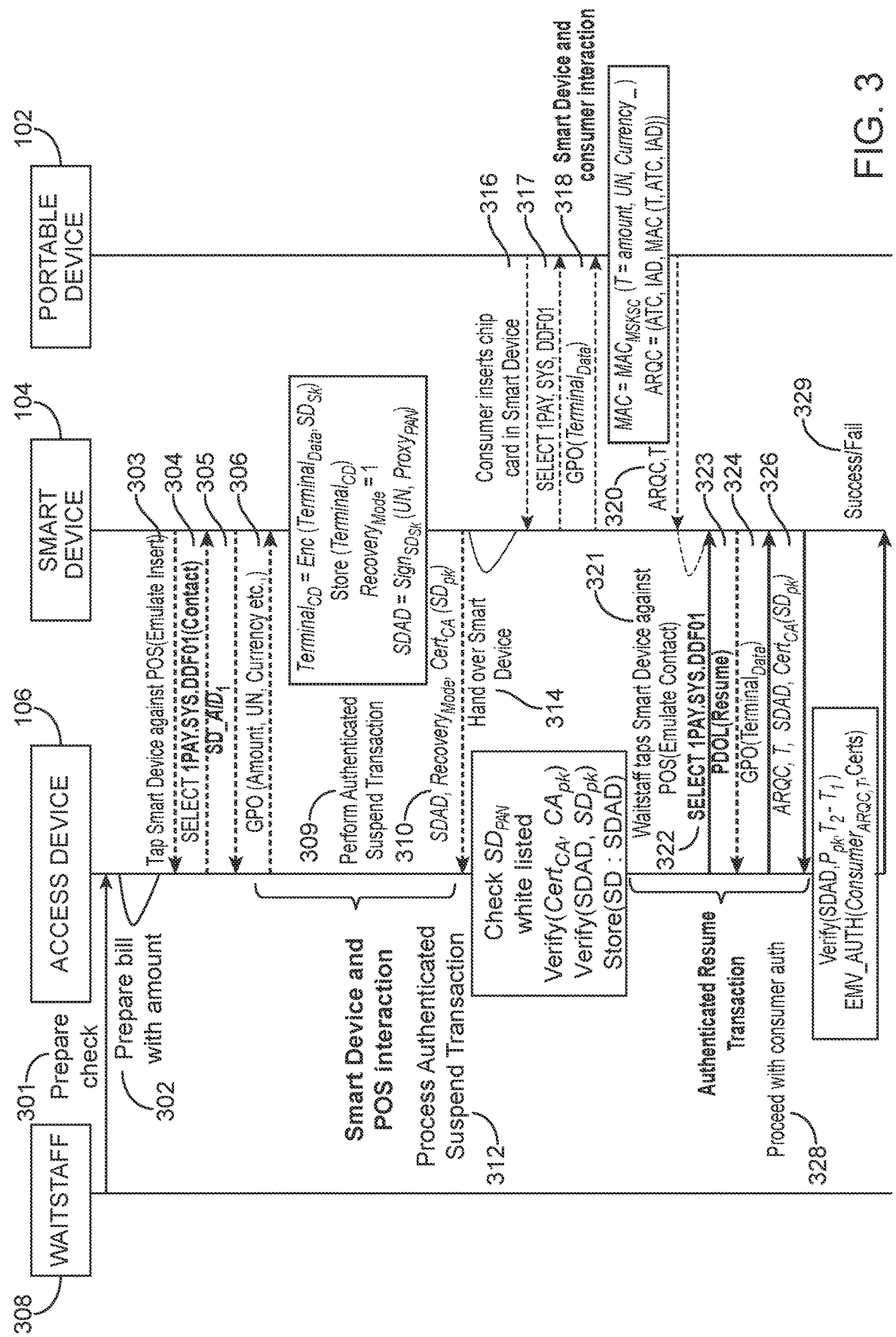
FIG. 3 shows an exemplary offline contact method according to embodiments of the invention.

FIG. 3 illustrates a flowchart for completing a transaction using the smart device 104 in the offline mode, while being in a contact communication with the portable device 102.

According to an embodiment illustrated in FIG. 3, a waitstaff 308 (e.g. an employee associated with the merchant) may tap the smart device 104 against the access device 106 to receive terminal data (i.e. the smart device 104 and the access device 106 are offline with respect to each other, and communicate over NFC). The "tap" action may represent the initiation of a first communication with the access device 106. The smart device 104 may emulate an insert (e.g. may emulate a portable device 102 being inserted in the access device 106), and may fetch the tags relating to contact and get processing options (GPO) and then may suspend the transaction. The waitstaff may then place the smart device 104 in front of the user of the portable device 102.

The user may insert the portable device 102 into the smart device 104 (i.e. the contact communication mode between the portable device 102 and the smart device 104). The smart device 104 may retrieve a cryptogram from the portable device 102 and may temporarily store the cryptogram. The waitstaff may retrieve the smart device 104 and then may tap the smart device 104 against the access device 106. The "tap" action may represent the initiation of a second communication with the access device 106. The smart device 104 may release the cryptogram to the access device 106 for payment authorization. The data, messages and commands exchanged between the parties illustrated in FIG. 3 are described below in greater detail.

At step 301, the waitstaff 308 may prepare a check for a transaction with the user. At step 302, the waitstaff 308 may enter an amount for the transaction in the access device 106. In some embodiments, the waitstaff 308 may select a card button to initiate payment.

At step 303, the waitstaff may tap, or otherwise bring into NFC range, the smart device 104 against the access device 106. In some embodiments, the smart device 104 may initiate a first communication with the access device 106.

During the interaction between the smart device 104 and the access device 106, data may be exchanged in one or more messages. For example, at step 304, after initiating communication with the access device 106, the smart device 104 may emulate the contact mode where the access device 106 selects a contact kernel. In this case the access device 106 may have determined to select the contact kernel. In other embodiments, the access device 106 may select a contactless kernel. In some embodiments, the contact kernel may be referred to as 1PAY.SYS.DDF01. The access device 106 may transmit the selected contact kernel to the smart device 104. In some embodiments, the smart device 104 may receive a first message from the access device 106.

At step 305, the smart device 104 may send a smart device applet identifier to the access device 106. In some embodiments, the smart device applet identifier may be referred to as SD_AID1. SD_AID1 may be the first application identifier of the smart device 104. The access device 106 may then select SD_AID1 in response to receiving the smart device applet identifier. In some embodiments, an applet identifier may be used to uniquely identify a specific payment application that the access device 106 supports. The smart device 104 may then send a processing options data object list (PDOL) (e.g., contact tags from Table. 1) to the access device 106.

At step 306, after receiving the PDOL, the access device 106 may transmit a get processing options (GPO) message including first interaction data to the smart device 104. In some embodiments, the GPO message may include terminal data or values generated by the access device 106. The terminal data may include information relating to the access device 106, as well as information related to the transaction such as the transaction amount, the transaction currency, an unpredictable number for generating a cryptogram, etc.

At step 309, the smart device 104 may store the first interaction data including the terminal data. The smart device 104 may set recovery. In some embodiments, the recovery may allow a suspended transaction to be resumed at a later time. For example, in FIG. 3, the recovery mode is set equal to a value of 1, which may indicate that the transaction may be resumed after the smart device 104 receives information from the portable device 102. In some embodiments, the smart device 104 may store the first message, wherein the access device 106 suspends the first interaction (e.g. the first communication).

At step 310, the smart device 104 may then send signed dynamic application data (SDAD) to the access device 106.

At step 312, after receiving the SDAD from the smart device 104, the access device 106 may verify the SDAD from the smart device 104. The access device 106 may then suspend the transaction by logging (e.g. storing) the SDAD in a transaction log or memory.

At step 314, the waitstaff 308 may bring the smart device 104 to the user of the portable device 102. For example, the user of the portable device 102 may be located at a table of a restaurant. The waitstaff may transport the smart device 104 from a first position to a second position proximate to the portable device 102. In some embodiments, the table may be considered to be located remotely in relation to the access device 106. In some embodiments, the smart device 104 may initiate communication with the portable device 102.

Pursuant to the supported communication mode between the smart device 104 and the portable device 102 being a contact mode, at step 316, the user may insert the portable device 102 into the smart device 104.

At step 317, the smart device 104 may select contact kernel (e.g. 1PAY.SYS.DDF01) and select a payment processing network. The selected payment processing network may have an associated card scheme and parameters relating to how the application can be processed.

At step 318, the portable device 102 may send the contact tags from Table 1 (e.g. PDOL) to the smart device 104. The smart device 104 may then respond with the first interaction data including the terminal data (e.g. GPO previously received from the access device at step 306) to the portable device 102.

At step 320, the portable device 102 may compute an authorization request cryptogram (ARQC). The portable device 102 may then send the ARQC and the transaction data as a second interaction data to the smart device 104. The smart device 104 may receive the cryptogram from the portable device 102. The cryptogram may identify an account associated with the portable device 102. For example, the cryptogram may include (in encoded form) at least an account identifier. The cryptogram may also include (in encoded form) credentials such as payment account identifying credentials and/or user identifying credentials.

The smart device 104 may store the cryptogram (ARQC) and the transaction data. In some embodiments, the smart device 104 may activate a visual indicator after receiving the cryptogram. According to some embodiments, the smart device 104 may then set a status of the visual indicator to a successful transmission. For example the smart device 104 may light up the visual indicator (e.g. a LED) to green. The user of the portable device 102 may then remove the portable device 102 from the smart device 104. In some embodiments, if the ARQC or the transaction data are not properly received at the smart device 104, then the smart device 104 may set the status of the visual indicator to an unsuccessful transmission. For example, the smart device 104 may light up the visual indicator (e.g. the LED) to red.

At step 321, the waitstaff 308 may bring the smart device 104 to the access device 106. The waitstaff 308 may move the smart device 104 away from the portable device 102 and towards the access device 106. The waitstaff 308 may tap the smart device 104 against, or otherwise bring the smart device 104 into NFC communication range with, the access device 106. In some embodiments, the smart device 104 may initiate a second communication with the access device 106.

At step 322, the access device 106 may choose the contact kernel and select the payment processing network selected by the user at step 317.

At step 323, the smart device 104 may send a command (e.g. the contact tags (PDOL)) to resume the transaction.

At step 324, the access device 106 may retrieve the previously suspended transaction by retrieving the transaction from the transaction log. The access device 106 may then extract terminal data and then send the terminal data (GPO) to the smart device 104.

At step 326, the smart device 104 may send the second interaction data including the cryptogram (ARQC). The cryptogram may include the first interaction data (e.g. the transaction data previously received from the portable device 102 at step 320). At step 326, the smart device 104 may also send the signed dynamic application data (SDAD) (similar to step 310) to authenticate itself to the access device 106. In some embodiments, the smart device 104 may send the cryptogram to the access device 106 in a third message. During the third message, the smart device 104 may provide data to the access device 106 to complete the transaction as if it was the portable device 102.

At step 328, the access device 106 may verify the smart device 104. The access device 106 may then send the cryptogram (ARQC) and the transaction data to the transport computer 108 in a transaction authorization request message. The transport computer 108 may transmit the transaction authorization request message to the processing network computer 110. The processing network computer 110 may transmit the transaction authorization request message to the authorizing computer 112 for authorization.

The access device 106 may receive a transaction authorization response message from the authorizing computer 112. The transaction authorization response message may indicate that the transaction is either authorized or declined by the authorizing computer 112.

At step 329, the access device 106 may send, to the smart device 104, an indication of the transaction being authorized or declined. In some embodiments, the smart device 104 may activate a visual indicator after receiving the indication of the transaction being authorized or declined. According to some embodiments, the smart device 104 may then set a status of the visual indicator to an authorized transaction. For example the smart device 104 may light up the visual indicator (e.g. a LED) to green. The user of the portable device 102 may therefore be notified of the authorized transaction. In some embodiments, the smart device 104 may then set a status of the visual indicator to a declined transaction. For example the smart device 104 may light up the visual indicator (e.g. a LED) to red. The user of the portable device 102 may therefore be notified of the declined transaction.

In some embodiments, the access device 106 may print a receipt for the transaction when the transaction is authorized by the authorizing computer 112. The access device 106 may then prompt the waitstaff 308 take the receipt to the user of the portable device 102 for signing.

Figure 4:
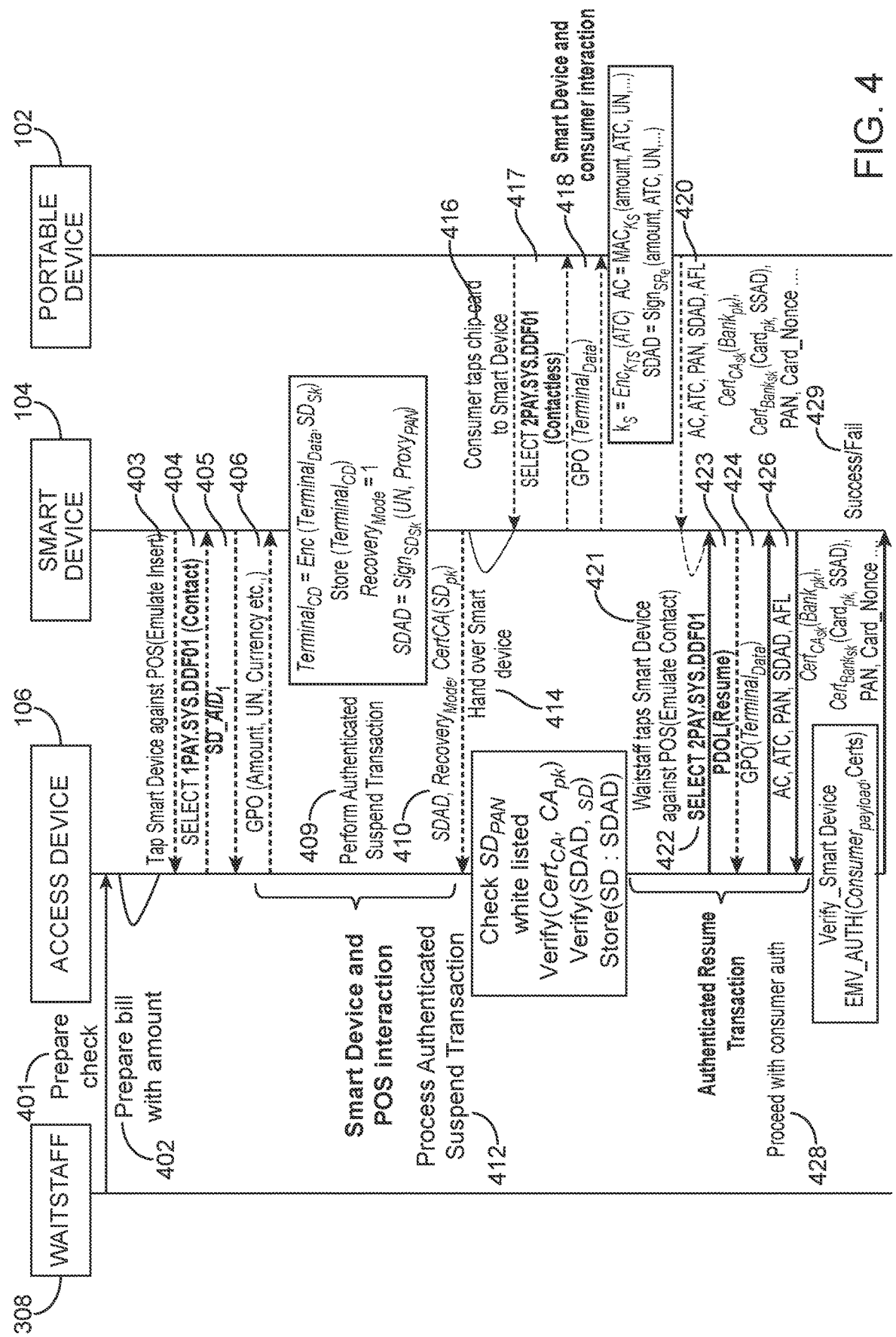
FIG. 4 shows a first exemplary offline contactless method according to embodiments of the invention.

1.2 the Smart Device Supports Contactless Communication with the Portable Device FIG. 4 illustrates a first exemplary flowchart for completing a transaction using the smart device 104 in the offline mode, while being in a contactless communication with the portable device 102.

According to an embodiment illustrated in FIG. 4, a waitstaff 308 (e.g. an employee associated with the merchant) may tap the smart device 104 against the access device 106 to receive terminal data (i.e. the smart device 104 and the access device 106 are offline with respect to each other, and communicate over NFC), the smart device 104 may emulate an insert (e.g. may emulate a portable device 102 being inserted in the access device 106), and may fetch the tags relating to contact and get processing options (GPO) and then may suspend the transaction. The waitstaff may then place the smart device 104 in front of the user of the portable device 102.

The user may tap the portable device 102 on the smart device 104 (i.e. the contactless communication mode between the portable device 102 and the smart device 104) rather than insert the portable device 102 into the smart device 104 as described in connection with FIG. 3. The smart device 104 may transmit the data associated with the transaction to the portable device 102 and may retrieve a cryptogram from the portable device 102 via NFC. The smart device 104 may temporarily store the cryptogram. The waitstaff may retrieve the smart device 104 and then may tap the smart device 104 against the access device 106. The smart device 104 may release the cryptogram to the access device 106 for payment authorization. The data, messages and commands exchanged between the parties illustrated in FIG. 4 are described below in greater detail.

Steps 401, 402, 403, 404, 405, 406, 409, 410, 412, 414, 418, 421, 423, 424, and 429 illustrated in FIG. 4 are identical to steps 301, 302, 303, 304, 305, 306, 309, 310, 312, 314, 318, 321, 323, 324, and 329, respectively, illustrated in FIG. 3. The detailed description of these steps is provided above in connection with FIG. 3, and is not reiterated here in connection with FIG. 4 for purposes of brevity. The main distinction between FIG. 4 and FIG. 3 relies on the interaction between the smart device 104 and the portable device 102, as well as the content of the data transmitted from the portable device 102 to the smart device 104.

Pursuant to the supported communication mode between the smart device 104 and the portable device 102 being a contactless mode, at step 416, the user may tap the portable device 102 to the smart device 104 for communication via NFC.

At step 417, the smart device 104 may select a contactless kernel (e.g. 2PAY.SYS.DDF01) and select a payment processing network. The selected payment processing network may have an associated card scheme and parameters relating to how the application can be processed.

At step 420, the portable device 102 may compute a cryptogram including one or more of signed dynamic application data (SDAD), application cryptogram (AC), application transaction counter (ATC), primary account number (PAN), public certificates. The portable device 102 may then send second interaction data including the cryptogram to the smart device 104. The smart device 104 may receive the cryptogram from the portable device 102 via NFC. The cryptogram may identify an account associated with the portable device 102. For example, the cryptogram may include at least an account identifier (e.g. PAN). The cryptogram may also include credentials such as payment account identifying credentials and/or user identifying credentials.

The smart device 104 may store the second interaction data including the cryptogram. In some embodiments, the smart device 104 may activate a visual indicator after receiving the cryptogram. According to some embodiments, the smart device 104 may then set a status of the visual indicator to a successful transmission. For example the smart device 104 may light up the visual indicator (e.g. a LED) to green. In some embodiments, if the cryptogram is not properly received at the smart device 104, then the smart device 104 may set the status of the visual indicator to an unsuccessful transmission. For example, the smart device 104 may light up the visual indicator (e.g. the LED) to red.

At step 421 (similar to step 321), the waitstaff 308 may bring the smart device 104 to the access device 106, wherein the waitstaff 308 may tap the smart device 104 against, or otherwise bring the smart device 104 into NFC communication range with, the access device 106. In some embodiments, the smart device 104 may initiate a second communication with the access device 106.

At step 422, the access device 106 may choose the contactless kernel and select the payment processing network selected by the user at step 417.

At step 426, the smart device 104 may send the cryptogram previously received from the portable device 102 at step 420. At step 426, the smart device 104 may also send the signed dynamic application data (SDAD) (similar to step 410) to authenticate itself to the access device 106. In some embodiments, the smart device 104 may send the cryptogram to the access device 106 in a third message. During the third message, the smart device 104 may provide data to the access device 106 to complete the transaction as if it was the portable device 102.

At step 428, the access device 106 may verify the smart device 104. The access device 106 may then send the cryptogram to the transport computer 108 in a transaction authorization request message. The transport computer 108 may transmit the transaction authorization request message to the processing network computer 110. The processing network computer 110 may transmit the transaction authorization request message to the authorizing computer 112 for authorization.

Figure 5:
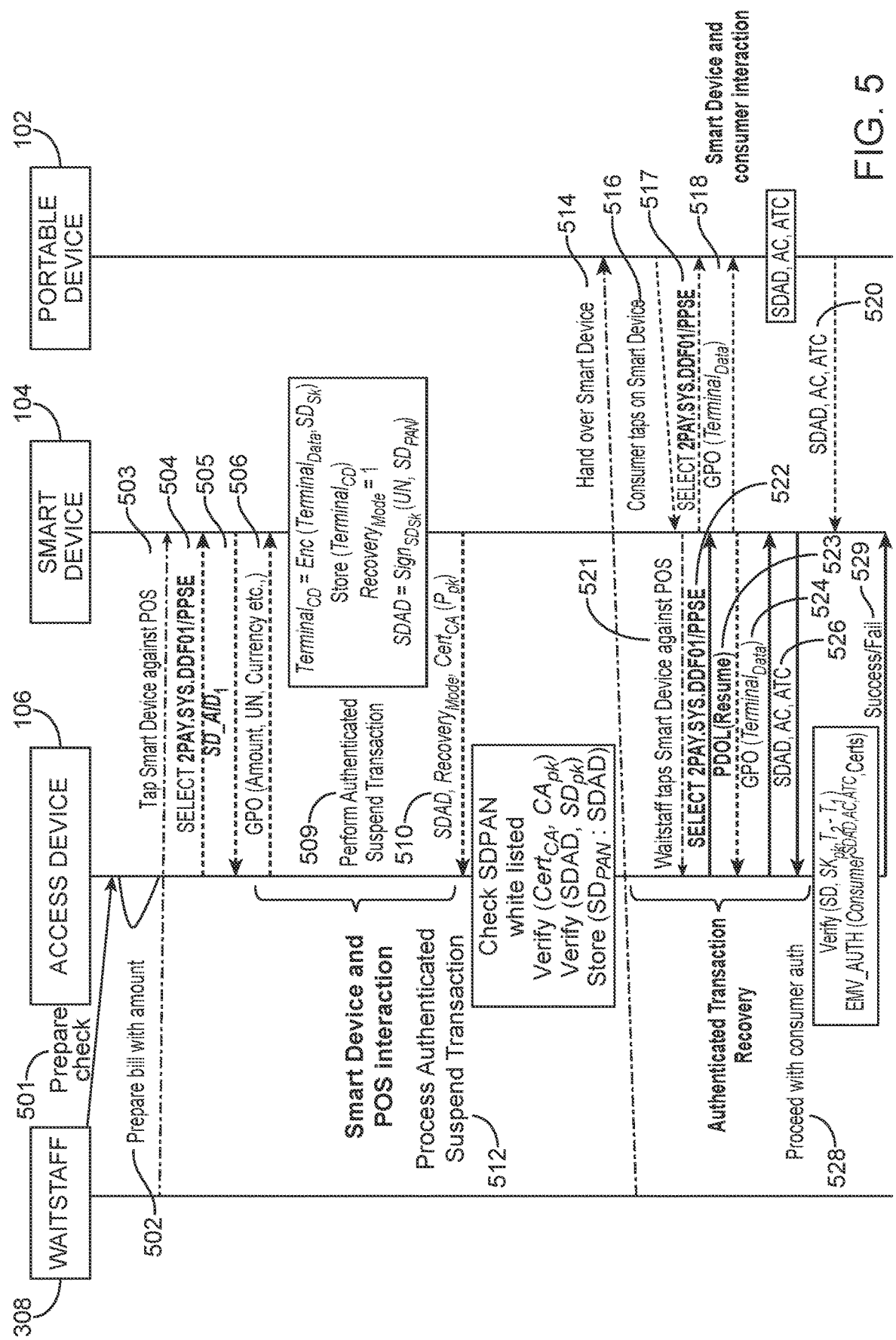
FIG. 5 shows a second exemplary offline contactless method according to embodiments of the invention.

FIG. 5 illustrates a second exemplary flowchart for completing a transaction using the smart device 104 in the offline mode, while being in a contactless communication with the portable device 102. The data, messages and commands exchanged between the parties illustrated in FIG. 5 are described below in greater detail.

Steps 501, 502, 503, 505, 506, 509, 510, 512, 514, 516, 518, 521, 523, 524, and 529 illustrated in FIG. 5 are identical to steps 401, 402, 403, 405, 406, 409, 410, 412, 414, 416, 418, 421, 423, 424, and 429, respectively, illustrated in FIG. 4. The detailed description of these steps is provided above in connection with FIG. 3 or 4, and is not reiterated here in connection with FIG. 5 for purposes of brevity. The main distinction between FIG. 5 and FIG. 4 relies on the selection of the payment processing network at step 504. This selection influences the content of messages exchanged at steps 517, 520, 522, 526, and 528.

At step 517, the smart device 104 may select a contactless kernel (e.g. 2PAY.SYS.DDF01) and select a different payment processing network than in FIG. 4. The selected payment processing network may have an associated card scheme and parameters relating to how the application can be processed. For example, the selected payment processing network may use a unified kernel for contactless payments.

At step 520, the portable device 102 may compute a cryptogram including one or more of signed dynamic application data (SDAD), application cryptogram (AC) and application transaction counter (ATC). The portable device 102 may then send the cryptogram to the smart device 104. The smart device 104 may receive the cryptogram from the portable device 102. The cryptogram may identify an account associated with the portable device 102. For example, the cryptogram may include at least an account identifier. The cryptogram may also include credentials such as payment account identifying credentials and/or user identifying credentials.

The smart device 104 may store the cryptogram. In some embodiments, the smart device 104 may activate a visual indicator after receiving the cryptogram. According to some embodiments, the smart device 104 may then set a status of the visual indicator to a successful transmission. For example the smart device 104 may light up the visual indicator (e.g. a LED) to green. In some embodiments, if the cryptogram is not properly received at the smart device 104, then the smart device 104 may set the status of the visual indicator to an unsuccessful transmission. For example, the smart device 104 may light up the visual indicator (e.g. the LED) to red.

At step 522, the access device 106 may choose the contactless kernel and select the payment processing network selected by the user at step 517.

At step 526, the smart device 104 may send the cryptogram previously received from the portable device 102 at step 520. At step 526, the smart device 104 may also send the signed dynamic application data (SDAD) (similar to step 510) to authenticate itself to the access device 106. In some embodiments, the smart device 104 may send the cryptogram to the access device 106 in a third message. During the third message, the smart device 104 may provide data to the access device 106 to complete the transaction as if it was the portable device 102.

At step 528, the access device 106 may verify the smart device 104. The access device 106 may then send the cryptogram to the transport computer 108 in a transaction authorization request message. The transport computer 108 may transmit the transaction authorization request message to the processing network computer 110. The processing network computer 110 may transmit the transaction authorization request message to the authorizing computer 112 for authorization.

2. Smart Device is Online with Respect to the Access Device

The following section corresponds with methods wherein the smart device 104 may be in an online mode with respect to the access device 106. In the online mode, the smart device 104 may communicate with the access device 106 via Bluetooth connection or a suitable wireless connection such as a communication network (e.g. Internet, LAN, WAN). Similar to the offline mode, the online mode may also eliminate credential theft by removing a need to handover the portable device 102 (e.g. a payment card) to the waitstaff. Moreover, the smart device 104 may support both a contact and contactless communication with the portable device 102.

Figure 6:
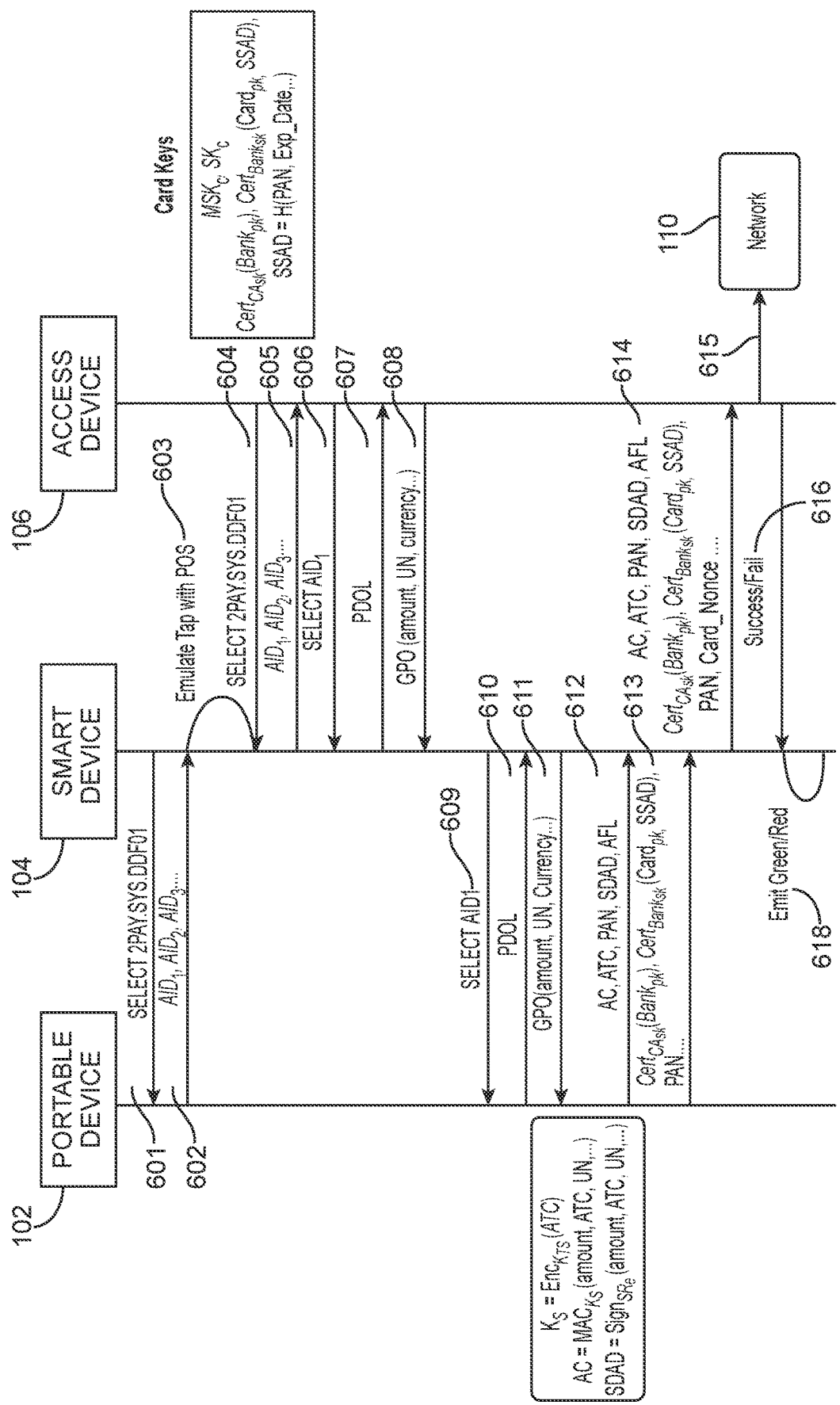
FIG. 6 shows a first exemplary online contactless method according to embodiments of the invention.

2.1 the Smart Device Supports Contactless Communication with the Portable Device FIG. 6 illustrates a first exemplary flowchart for completing a transaction using the smart device 104 in the online mode, while being in a contactless communication with the portable device 102. In the first exemplary flowchart, the portable device 102 may be a trusted device and may not require validation prior the generation of the unpredictable number by the portable device 102.

According to an embodiment illustrated in FIG. 6, a waitstaff 308 (e.g. an employee associated with the merchant) may enter information about the consumer's order or an amount into the access device 106. The access device 106 may then push a command to the smart device 104 to receive payment for a predetermined amount.

The waitstaff may bring the smart device 104 to the user. The user may tap the portable device 102 on the smart device 104 (i.e. the contactless communication mode between the portable device 102 and the smart device 104). The smart device 104 may receive payment credentials (in some embodiments, in form of a cryptogram) from the portable device 102. The smart device 104 may relay the payment credentials to the remote access device 106 via a wireless connection, for example, BLE connection. The user of the portable device may walk out after being notified that the payment is successful. The data, messages and commands exchanged between the parties illustrated in FIG. 6 are described below in greater detail.

At step 601, the smart device 104 may select a proximity payment system environment (e.g. 2PAY.SYS.DDF01) and transmit a message identifying the selected proximity payment system environment to the portable device 102.

In response, at step 602, the portable device 102 may send a list of applet identifiers (AID1, AID2 . . . ) to the smart device 104. In some embodiments, an applet identifier may be used to uniquely identify a specific payment application.

At step 603, the smart device 104 may emulate a tap against the access device 106. For example, the smart device 104 may send a first communication to the access over the Bluetooth connection or any suitable communication channel device 106 to initiate communication with the access device 106.

At step 604, the access device 106 may transmit to the smart device 104 a message to identify the selected contactless kernel (e.g. 2PAY.SYS.DDF01).

At step 605, the smart device 104 may send the list of applet identifiers (AID1, AID2 . . . ) to the access device 106. At step 606, the access device 106 may select an applet identifier (e.g. AID1) in response to receiving the list of applet identifiers. In some embodiments, an applet identifier may be used to uniquely identify a specific payment application that the access device 106 supports. At step 607, the smart device 104 may send a processing options data object list (PDOL) (e.g., contact tags from Table. 1) to the access device 106.

At step 608, after receiving the PDOL, the access device 106 may transmit a get processing options (GPO) message including first interaction data to the smart device 104. In some embodiments, the first interaction data may include terminal data. The terminal data may include information relating to the access device 106, as well as information related to the transaction such as the transaction amount, the transaction currency, an unpredictable number for generating a cryptogram, etc.

At step 609, the smart device 104 may select the applet identifier (e.g. AID1) selected by the access device 106 at step 606 and transmit the selection to the portable device 102 over NFC connection. At step 610, the portable device 102 may send a processing options data object list (PDOL) (e.g., contact tags from Table. 1) to the smart device 104. In response, at step 611, the smart device 104 may then send the get processing options (GPO) message received from the access device 106 (at step 608) to the portable device 102.

At step 612, the portable device 102 may compute and send signed dynamic application (SDAD) if needed and may then generate an application cryptogram (AC).

At step 613, the portable device 102 may send second interaction data including one or more of the application cryptogram, an application transaction counter (ATC), an account identifier (e.g. PAN), and public certificates to the smart device 104. According to various embodiments, the application cryptogram may be verified by the issuer. The public certificates may be from the certificate authority (CA) and/or the issuer.

At step 614, the smart device 104 may send the second interaction data including all of the data received from the portable device 102 to the access device 106. In some embodiments, the smart device 104 may send the second interaction data in batch mode (e.g. all data may be sent in a single message, after all data has been collected from the portable device 102) instead of a pass-through mode where the second interaction data may be sent as it is received from the portable device 102. The batch mode may eliminate several messages between the smart device 104 and the access device 106. According to various embodiments, the access device 106 may be in communication with a plurality of portable devices (as will be explained below in greater detail in connection with FIGS. 10A and 10B). Thus, compact communication between the access device 106 and any one of the portable devices will improve the processing power and efficiency of the access device 106.

At step 615, the access device 106 may contact the payment/transaction processing computer 110 for authorization. The access device 106 may generate and transmit a transaction authorization request message to the processing network computer 110. The processing network computer 110 may transmit the transaction authorization request message to the authorizing computer 112 for authorization.

The access device 106 may receive a transaction authorization response message from the authorizing computer 112. The transaction authorization response message may indicate that the transaction is either authorized or declined by the authorizing computer 112. After receiving a success/fail response from the processing network computer 110, the access device 106 may send the success/fail response to the smart device 104 (step 616).

At step 618, the smart device 104 may determine whether or not the transaction was authorized by the authorizing computer 112. In some embodiments, the smart device 104 may activate a visual indicator after receiving the indication of the transaction being authorized or declined.

Figure 7:
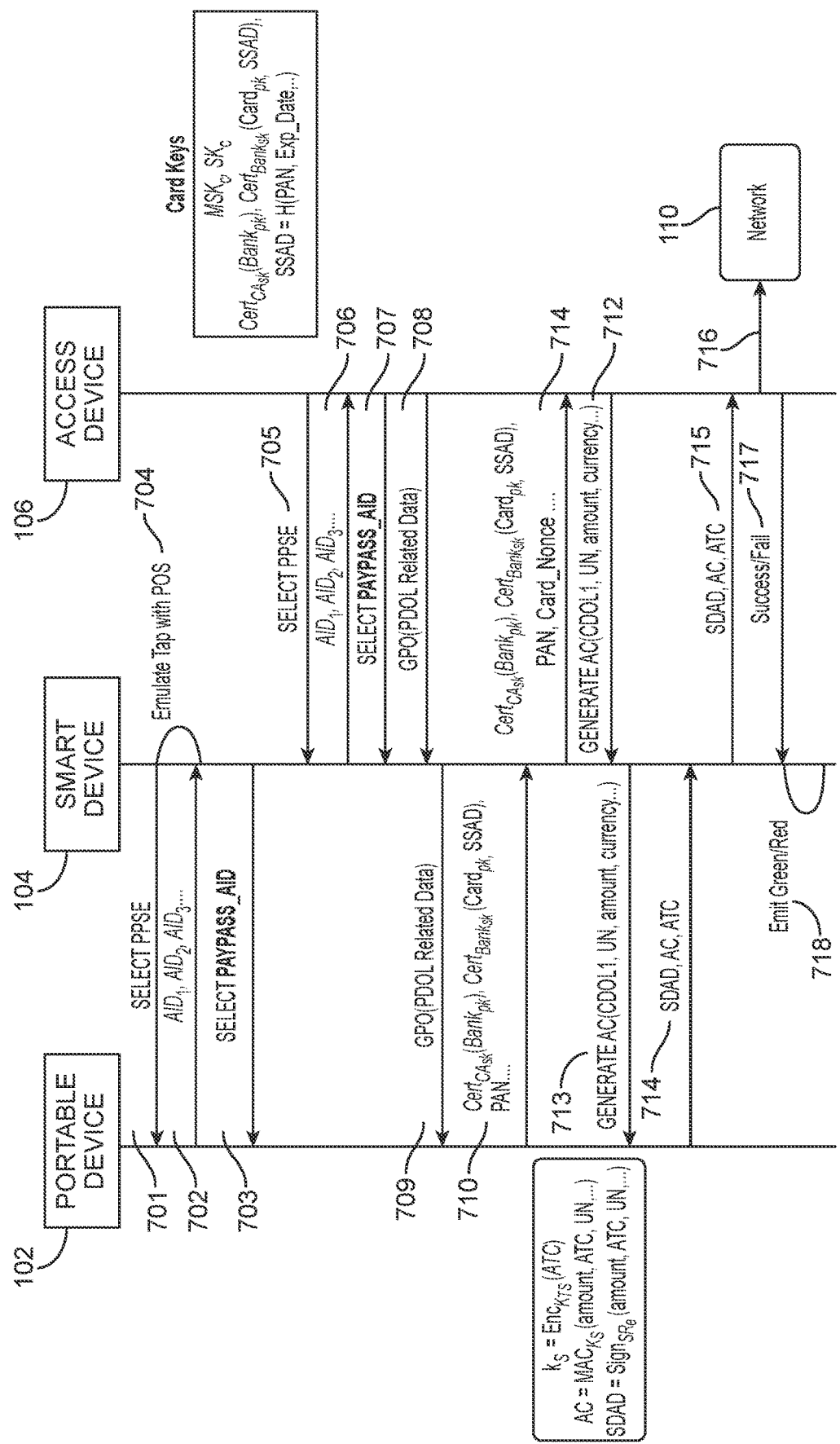
FIG. 7 shows a second exemplary online contactless method according to embodiments of the invention.

FIG. 7 illustrates a second exemplary flowchart for completing a transaction using the smart device 104 in the online mode, while being in a contactless communication with the portable device 102. In the second exemplary flowchart, the portable device 102 may be validated prior the generation of the unpredictable number by the portable device 102.

According to an embodiment illustrated in FIG. 7, a waitstaff 308 (e.g. an employee associated with the merchant) may enter information about the consumer's order or an amount into the access device 106. The access device 106 may then may push a command to the smart device 104 to receive payment for a predetermined amount.

The waitstaff may bring the smart device 104 to the user. The user may tap the portable device may the portable device on the smart device 104 (i.e. the contactless communication mode between the portable device 102 and the smart device 104). The smart device 104 may receive payment credentials (in some embodiments, in form of a cryptogram) from the portable device 102. The smart device 104 may relay the payment credentials to the remote access device 106 via, for example, BLE connection. The user of the portable device may walk out after being notified that the payment is successful. The data, messages and commands exchanged between the parties illustrated in FIG. 7 are described below in greater detail.

At step 701, the smart device 104 may select a proximity payment system environment (e.g. PPSE) and transmit a message identifying the selected proximity payment system environment to the portable device 102.

At step 702, the portable device 102 may send a list of applet identifiers (AID1, AID2 . . . ) to the smart device 104. In some embodiments, an applet identifier may be used to uniquely identify a specific payment application.

At step 703, the smart device 104 may select an applet identifier (PAYPASS_AID) and send the selected applet identifier to the portable device 102. In some embodiments, an applet identifier may be used to uniquely identify a specific payment application.

At step 704, the smart device 104 may emulate a tap against the access device 106. For example, the smart device 104 may send a first communication to the access over the Bluetooth connection or any suitable communication channel device 106 to initiate communication with the access device 106.

At step 705, the access device 106 may transmit to the smart device 104 a message to identify the selected contactless kernel (e.g. PPSE).

At step 706, the smart device 104 may send the list of applet identifiers (AID1, AID2 . . . ) to the access device 106.

At step 707, the access device 106 may select an applet identifier (e.g. PAYPASS_AID) in response to receiving the list of applet identifiers from the smart device 104. The selected applet identifier (e.g. PAYPASS_AID) is the same applet identifier selected by the smart device 104 at step 703.

At step 708, the access device 106 may transmit a get processing options (GPO) message to the smart device 104. In this exemplary embodiment, the access device 106 may send the GPO message without first receiving the PDOL from the smart device. In this embodiment, the GPO message may include PDOL related data.

At step 709, the smart device 104 may send the get processing options (GPO) message received from the access device 106 (at step 708) to the portable device 102.

At step 710, the portable device 102 may send one or more of an account identifier (e.g. PAN), and public certificates to the smart device 104.

At step 711, the smart device 104 may send all of the data received from the portable device 102 to the access device 106.

At step 712, the access device 106 may verify the data provided by the portable device 102 to validate the portable device 102. After validating the portable device 102, the access device 106 may request the generation of an application cryptogram by the portable device 102. The access device 106 may send a request to the smart device 104. The request may include terminal data. The terminal data may include information relating to the access device 106, as well as information related to the transaction such as the transaction amount, the transaction currency, an unpredictable number for generating a cryptogram, etc.

At step 713, the smart device 104 may send the request for the generation of the application cryptogram to the portable device 102.

At step 714, the portable device 102 may compute and send a signed dynamic application (SDAD), the application cryptogram (AC), and an application transaction counter (ATC) to the smart device 104.

At step 715, the smart device 104 may send all of the data received from the portable device 102 to the access device 106.

At step 716, the access device 106 may contact the payment/transaction processing network computer 110 for authorization. The access device 106 may generate and transmit a transaction authorization request message to the processing network computer 110. The processing network computer 110 may transmit the transaction authorization request message to the authorizing computer 112 for authorization.

The access device 106 may receive a transaction authorization response message from the authorizing computer 112. The transaction authorization response message may indicate that the transaction is either authorized or declined by the authorizing computer 112. After receiving a success/fail response from the processing network computer 110, the access device 106 may send the success/fail response to the smart device 104 (step 717).

At step 718, the smart device 104 may determine whether or not the transaction was authorized by the authorizing computer 112. In some embodiments, the smart device 104 may activate a visual indicator after receiving the indication of the transaction being authorized or declined.

2.2 the Smart Device Supports Contact Communication with the Portable Device

Figure 8A:
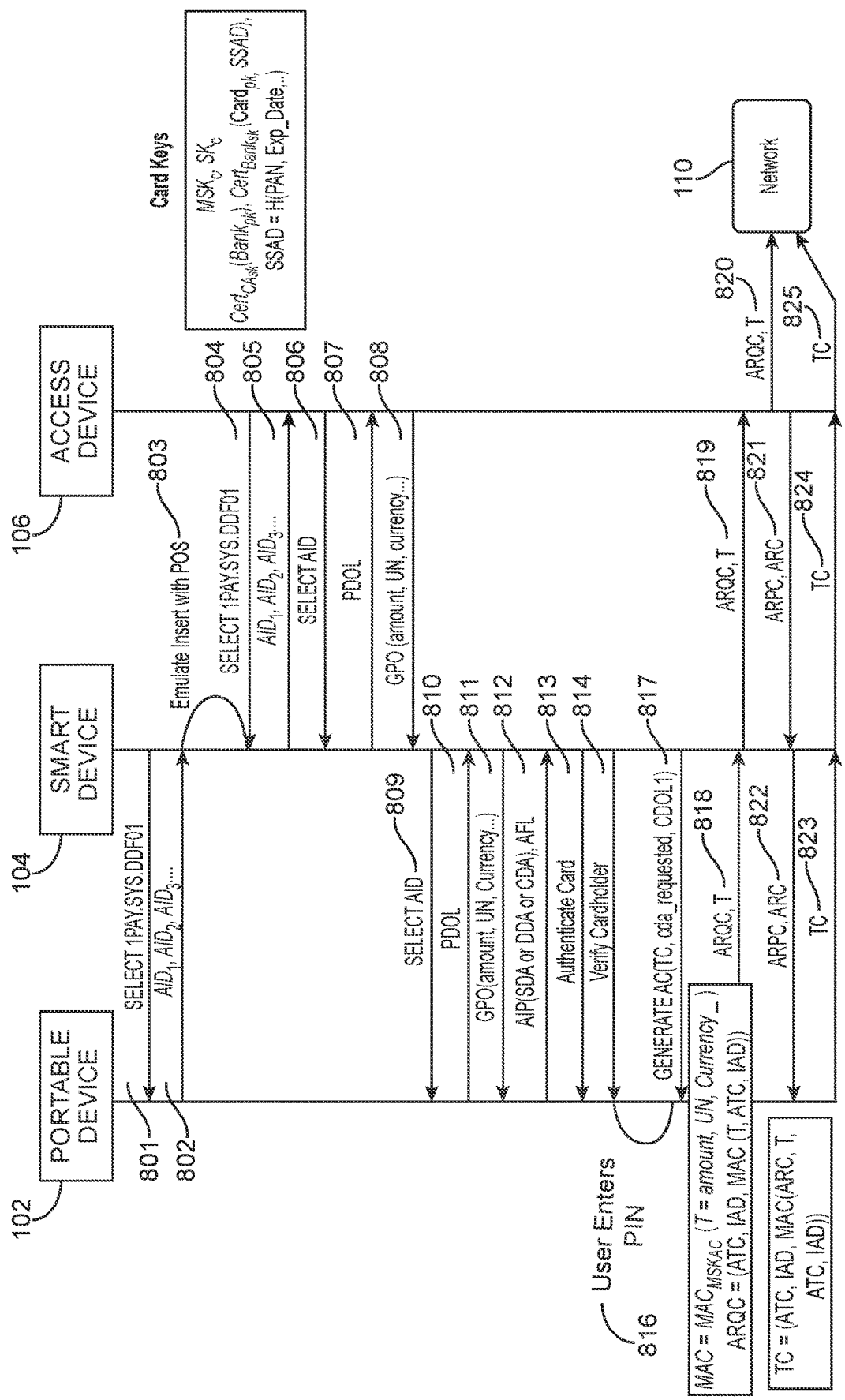
FIG. 8A shows a first exemplary online contact method using a chip card according to embodiments of the invention.

FIG. 8A illustrates a first exemplary flowchart for completing a transaction using the smart device 104 in the online mode, while being in a contact communication with the portable device 102.

According to an embodiment illustrated in FIG. 8A, a waitstaff 308 (e.g. an employee associated with the merchant) may enter information about the consumer's order or an amount into the access device 106. The access device 106 may then may push a command to the smart device 104 to receive payment for a predetermined amount.

The waitstaff may bring the smart device 104 to the user. The user may insert the portable device into the smart device 104 (i.e. the contact communication mode between the portable device 102 and the smart device 104). The smart device 104 may receive payment credentials (in some embodiments, in form of a cryptogram) from the portable device 102. The smart device 104 may relay the payment credentials to the remote access device 106 via, for example, BLE connection. The user of the portable device may walk out after being notified that the payment is successful. The data, messages and commands exchanged between the parties illustrated in FIG. 8A are described below in greater detail.

At step 801, the smart device 104 may select a target application (e.g. the contact kernel (e.g., 1PAY.SYS.DDF01)) and transmit the selection of the target application to the portable device 102.

At step 802, the portable device 102 may transmit a list of applet identifiers (AID1, AID2 . . . ) to the smart device 104. In some embodiments, an applet identifier may be used to uniquely identify a specific payment application.

At step 803, the smart device 104 may emulate an insert action with the access device 106.

At step 804, the access device 106 may select the same target application (e.g. the contact kernel (e.g., 1PAY.SYS.DDF01)) and transmit the selection of the target application to the smart device 104.

At step 805, the smart device 104 may transmit the list of applet identifiers (AID1, AID2 . . . ) to the access device 106. In some embodiments, an applet identifier may be used to uniquely identify a specific payment application.

At step 806, the access device 106 may select an applet identifier (AID1) and send the selected applet identifier to the smart device 104. In some embodiments, an applet identifier may be used to uniquely identify a specific payment application.

At step 807, the smart device 104 may send a processing options data object list (PDOL) (e.g., contact tags from Table. 1) to the access device 106.

At step 808, after receiving the PDOL, the access device 106 may transmit a get processing options (GPO) message to the smart device 104. In some embodiments, the GPO message may include terminal data. The terminal data may include information relating to the access device 106, as well as information related to the transaction such as the transaction amount, the transaction currency, an unpredictable number for generating a cryptogram, etc.

At step 809, the smart device 104 may transmit the selection of the applet identifier (e.g. AID1) to the portable device 102 while the portable device 102 is in contact communication with (e.g. inserted into) the smart device 104. At step 610, the portable device 102 may send a processing options data object list (PDOL) (e.g., contact tags from Table. 1) to the smart device 104. In response, at step 611, the smart device 104 may then send the get processing options (GPO) message received from the access device 106 (at step 808) to the portable device 102.

At step 812, the portable device 102 may transmit data to the smart device 104 for the smart device to verify the portable device 102 using a verification method (e.g. a static data authentication (SDA), a dynamic data authentication (DDA), or a combined DDA and application cryptogram generation (CDA) method). In some embodiments, the portable device 102 may transmit an application interchange profile (AIP) and an application file locator (AFL) to the smart device 104 at step 812.

At step 813, the smart device 104 may authenticate the portable device 102. For example, the access device 106 may check whether the portable device 102 is still valid and not expired, and check any other application usage controls (e.g., domestic/international, cashback etc.).

At step 814, the smart device 104 may verify the user (e.g. cardholder). For example, the smart device 104, in connection with the access device 106, may use cardholder verification methods (CVM) to determine whether the portable device 102 is lost or stolen. The access device 106, through the smart device 104, may challenge the user of the portable device 102 to enter a passcode. At step 816, the user may enter an identification number (e.g. PIN) associated with the portable device 102 on the smart device 104. According to various embodiments, the smart device 104 may include input means (e.g. a keyboard, a digital writing pad, etc.) to receive the identification number from the user. The cardholder verification is further described below in connection with FIG. 11.

According to various embodiments, the access device 106 may check the transaction against various rules, for example a merchant floor limit, card is in exception file, offline limit reached, velocity checks, etc. The access device 106 may also determine whether the transaction should be approved online or offline based on the results from various phases such as offline data authentication, processing restrictions, and CVM.

At step 817, the smart device 104 may send a command to the portable device 102 requesting generation of an account cryptogram. In response, at step 818, the portable device 102 may compute an authorization request cryptogram (ARQC) using application data and keys stored in the portable device 102, and send the cryptogram along with transaction data to the smart device 104.

At step 819, the smart device 104 may transmit the cryptogram and the transaction data to the access device 106. The access device 106 may determine whether the transaction requires an online authorization.

If the access device 106 determines that the transaction requires an online authorization, at step 820, the access device 106 may send the cryptogram and the transaction data to a processing network computer 110. For example, the access device 106 may generate and transmit a transaction authorization request message including the cryptogram and the transaction data to the processing network computer 110. The processing network computer 110 may transmit the transaction authorization request message to the authorizing computer 112 for authorization.

At step 821, the access device 106 may send an authorization response cryptogram (ARPC) to the smart device 104. At step 822, the smart device 104 may transmit the authorization response cryptogram to the portable device 102 for post authorization processing. In embodiments where the processing network computer 110 or an authoring computer (e.g. issuer computer) supplied scripts in the ARPC, the access device 106 may request the portable device 102 to run the scripts to update any offline processing parameters.

At step 823, the portable device 102 may validate the response from processing network computer 110 or the authorizing computer (e.g., the authorization response cryptogram (ARPC)), and may generate a final cryptogram. The portable device 102 may send the final cryptogram to the smart device 104, which may then transmit the final cryptogram to the access device 106 at step 824. The access device 106 may transmit the final cryptogram to the processing network computer 110 at step 825. This way, the smart device 104 may relay verification results back to the processing network computer 110 via the smart device 104 and the access device 106.

Figure 8B:
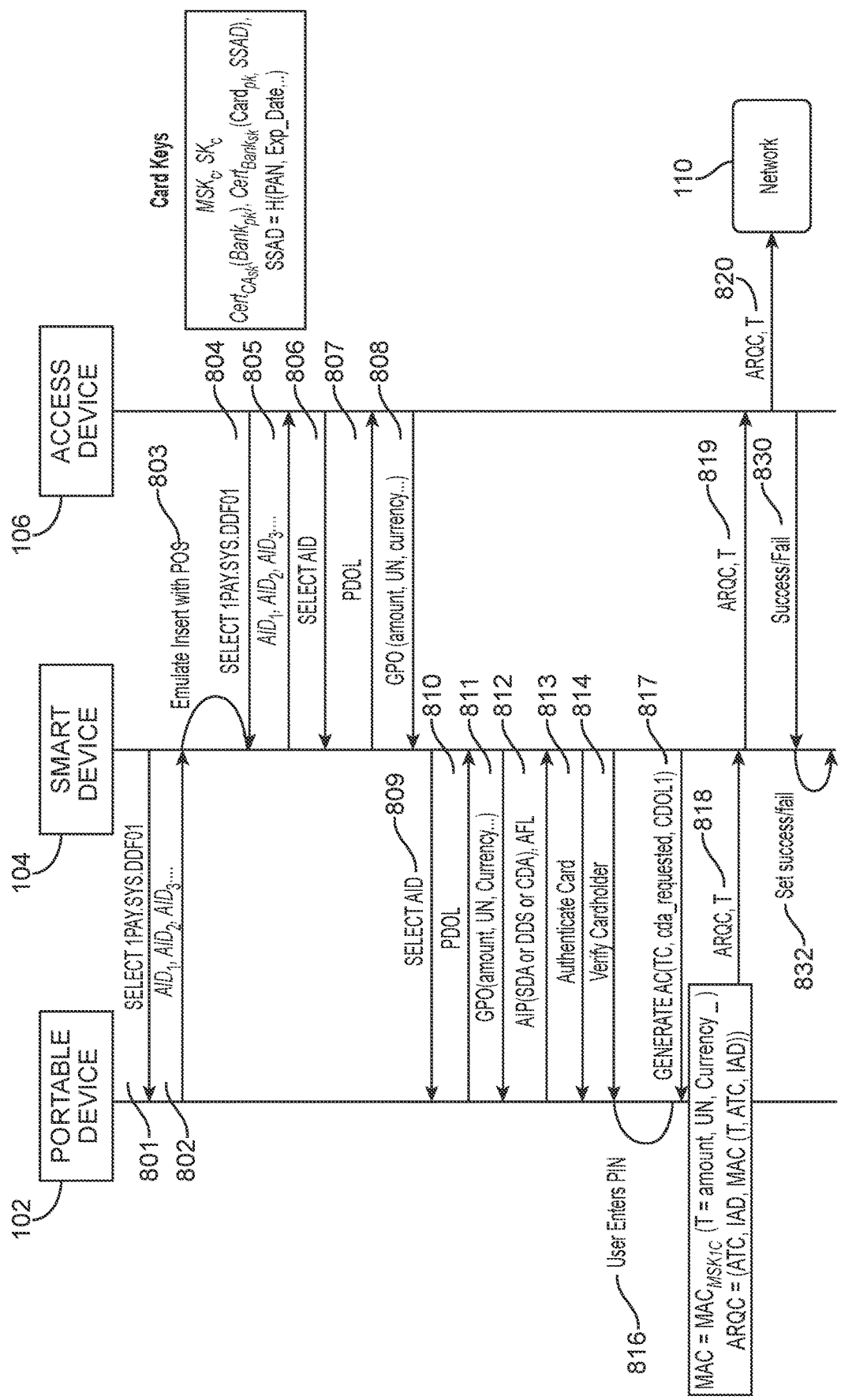
FIG. 8B shows a second exemplary online contact method using a quick chip car according to embodiments of the invention.

FIG. 8B illustrates a second exemplary flowchart for completing a transaction using the smart device 104 in the online mode, while being in a contact communication with the portable device 102. In the exemplary embodiment illustrated in FIG. 8B, the portable device 102 may include a quick chip or a fast chip that enable the user to dip and remove the portable device 102 at the smart device 104 for a fast checkout in about two seconds or less. The smart device 104 may prompt the user to decouple (e.g. remove) the portable device 102 from the smart device 104 after an initial card analysis phase. In FIG. 8B relative to FIG. 8A, steps 821, 822, 823, 824, and 825 need not be performed, thereby speeding up the transaction.

Steps 801-820 of FIG. 8B are identical to steps 801-820, respectively of FIG. 8A. The detailed description of these steps is provided above in connection with FIG. 8A, and is not reiterated here in connection with FIG. 8B for purposes of brevity.

After the access device 106 sends the cryptogram and the transaction data to the processing network computer 110 at step 820, the exemplary embodiment illustrated in FIG. 8B proceeds to a transaction finalization phase where the user is notified of the outcome of the transaction authorization request.

According to the exemplary embodiment illustrated in FIG. 8B, the access device 106 may receive a transaction authorization response message from the processing network computer 110. The transaction authorization response message may indicate that the transaction is either authorized or declined by an authorizing computer. After receiving a success/fail response from the processing network computer 110, the access device 106 may send the success/fail response to the smart device 104 (step 830).

At step 832, the smart device 104 may determine whether or not the transaction was authorized by the authorizing computer 112. In some embodiments, the smart device 104 may activate a visual indicator after receiving the indication of the transaction being authorized or declined.

Figure 9:
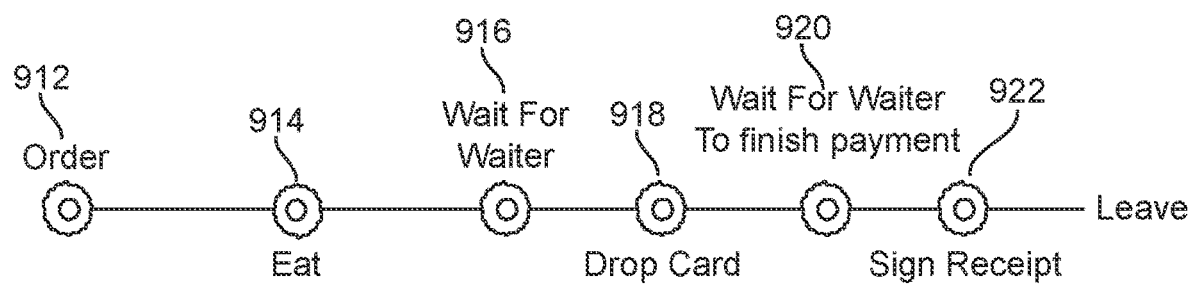
FIG. 9 shows an exemplary flow diagram for purchasing a meal using a traditional method and an exemplary method according to embodiments of the invention.
Figure 9:
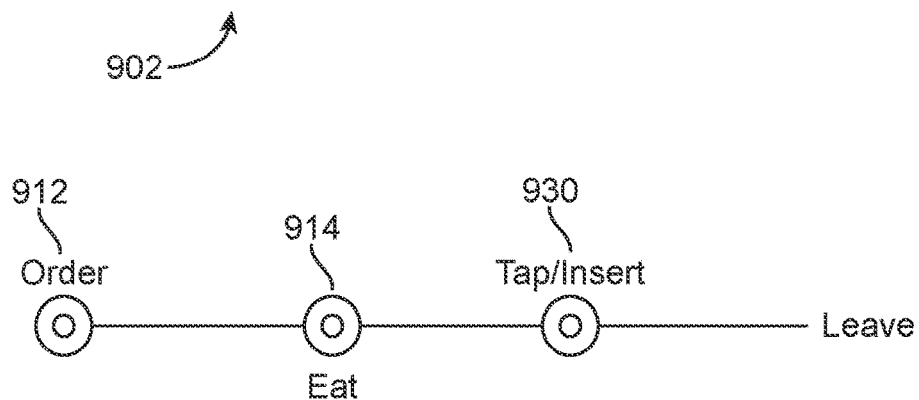

The foregoing methods are described in reference to a transaction at a restaurant. FIG. 9 shows an example flow diagram of purchasing a meal at a restaurant using a conventional method 902 and an exemplary method 904 according to various embodiments discussed above.

Using the conventional method 902, the user may place an order for food at a restaurant (or for other goods sold at a merchant) at step 912. When the user is ready to leave the restaurant at step 912, the user may call the waitstaff. When the waitstaff brings the check at step 916, the user may hand over their portable device (e.g. payment card) to the waitstaff at step 918. The waitstaff may take the portable device to the payment terminal, and process the payment for the user at step 920. At step 922, the waitstaff may bring a transaction slip to the user for the user to sign. The user may then leave the restaurant.

On the other hand, using the exemplary method 904 according to various embodiments discussed above, the user never hands over their payment card, and the transaction is processed faster. As illustrated in method 904, after the user calls the waitstaff, the waitstaff may bring over the smart device to the user. In some embodiments, the smart device may already be provided at the user's table. The smart device may automatically receive the transaction details from the access device when the user indicates their desire to pay. At step 930, the user may tap/insert their portable device to the smart device, and complete the transaction at the same step. The user may then leave the restaurant.

According to various embodiments, an access device may be associated with (e.g. in communication with) a plurality of smart devices. For example, in the exemplary embodiment illustrated in FIG. 10A, the access device 106 may be in communication with smart devices 1002A-1002L. For example, the smart devices 1002A-1002L may be located throughout a restaurant, wherein the access device 106 may be located at any suitable location in the restaurant. In some embodiments, the smart devices 1002A-1002L may be located at any suitable location, such as at tables. For example, a payment network 1000 may be created by first assigning each smart device 1002A-1002L to a unique table. Alternatively, each one of the smart devices 1002A-1002L may be assigned and carried around by one or more waitstaff. According to various embodiments, the smart devices 1002A-1002L may be paired, in a slave mode, with the access device 106, in a master mode, in order to establish a secure communication channel between the access device 106 and each one of the smart devices 1002A-1002L.

Figure 10A:
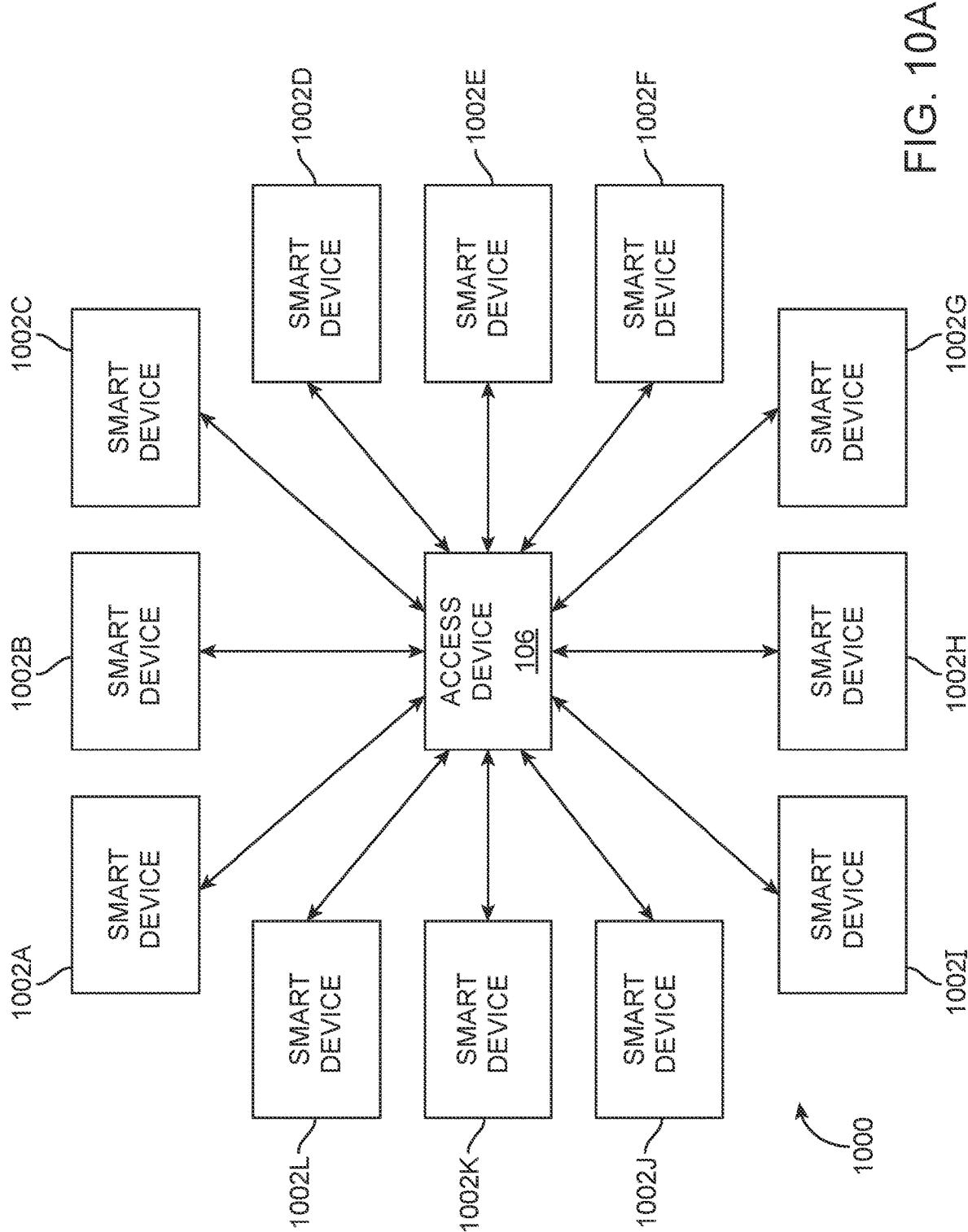
FIG. 10A shows a block diagram of a system with multiple smart devices according to embodiments of the invention of the invention.

According to an exemplary embodiment using the payment network 1000 illustrated in FIG. 10A, the user of a portable device 102 may initiate a transaction. First, the waitstaff may enter an amount for the transaction and choose a table number at the access device 106. The table number may correspond to the table that the user of the portable device 102 is located at, for example, table T1. The waitstaff may select table T1 to perform the transaction.

The access device 106 may send a command (<RECEIVE PAYMENT, $135>) via Bluetooth connection or any other suitable communication channel to the smart device 1002A available on Table T1. The smart device 1002A on T1 may then decrypt the command (<RECEIVE PAYMENT, $135>). After decrypting the command, the smart device 1002A may display the amount. The user of the portable device 102 may then use the portable device 102 to pay in either in the contact mode or the contactless mode.

According to various embodiments, each smart device 1002A-1002L may be a bridge device and may relay commands back and forth between the access device 106 and the portable device 102. Embodiments may use sequential and batch modes for relaying messages in an effort to improve the speed of the system. In the batch mode, the smart device may accumulate two or more data items received from either one of the portable device 102 or the access device 106 before transmitting the two or more data items to the other one of the portable device 102 or the access device 106. For example, the sequential relay may be used until the smart device 104 receives the GPO from the access device 106, and finishes the transaction with the portable device 102. The smart device 104 may then send all the results to the access device 106 using the batch mode.

According to various embodiments, the network 1000 illustrated in FIG. 10A may bootstrapped by connecting every smart device 1002A-1002I to the access device 106 via, for example, Bluetooth connection. Although the BLE 4 technology may offer long range (100 m) communication, there could be a chance that some restaurants might be bigger. In these cases, it may not be possible for every smart device 1002A-1002I to connect to the access device 106 directly. In this setting, a relay routing (e.g. based on shortest path algorithm) may be implemented.

Figure 10B:
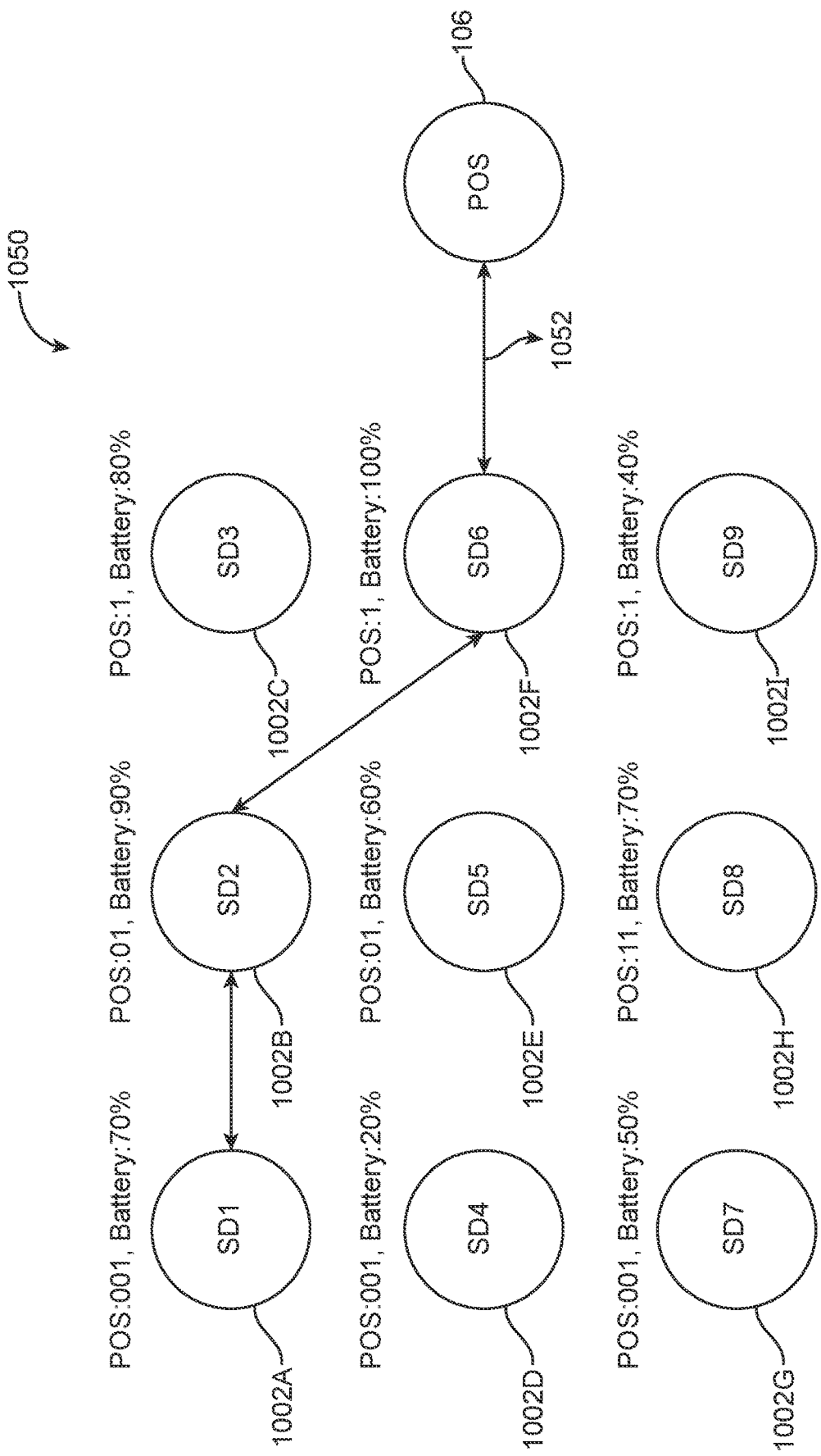
FIG. 10B shows relay payment routing according to embodiments of the invention.

FIG. 10B illustrates an exemplary relay routing according to an embodiment of the invention.

Each of the smart devices 1002A-1002I may have a distance value and a battery value. The distance value may be the distance from the smart device to the access device 106. The battery value may be an amount of battery life left for the smart device 1002A-1002I. For example, in FIG. 10B, the seventh smart device SD7 1002G has a distance value of 001 and a battery value of 50%. In some embodiments, the distance values may be on a relative scale (e.g., 01). In other embodiments, the distance values may be on an absolute scale (e.g., 5 meters).

Every node in the network 1050, i.e. the smart devices 1002A-1002I, may advertise the profile identifier by encoding the distance value and the battery value of the node. Any node that cannot connect directly to the access device 106, may use the profile identifiers to determine a shortest path to the access device 106. Each of the smart devices 1002A-1002I may determine the shortest path to the access device 106 based on the profile identifier. For example, in FIG. 10B, the first smart device SD1 1002A may receive a profile identifier from each of the other smart devices 1002A-1002I. The first smart device SD1 1002A may determine that the shortest path 1052 to the access device 106 is via the second smart device SD2 1002B and then the sixth smart device SD6 1002F. The smart device may determine to route messages through smart devices that are nearer to the access device 106 as well as that have a higher battery value. After determining the shortest path to the access device 106, the smart devices 1002A-1002I may relay payment information to the access device 106 via the smart devices in the shortest path.

Figure 11:
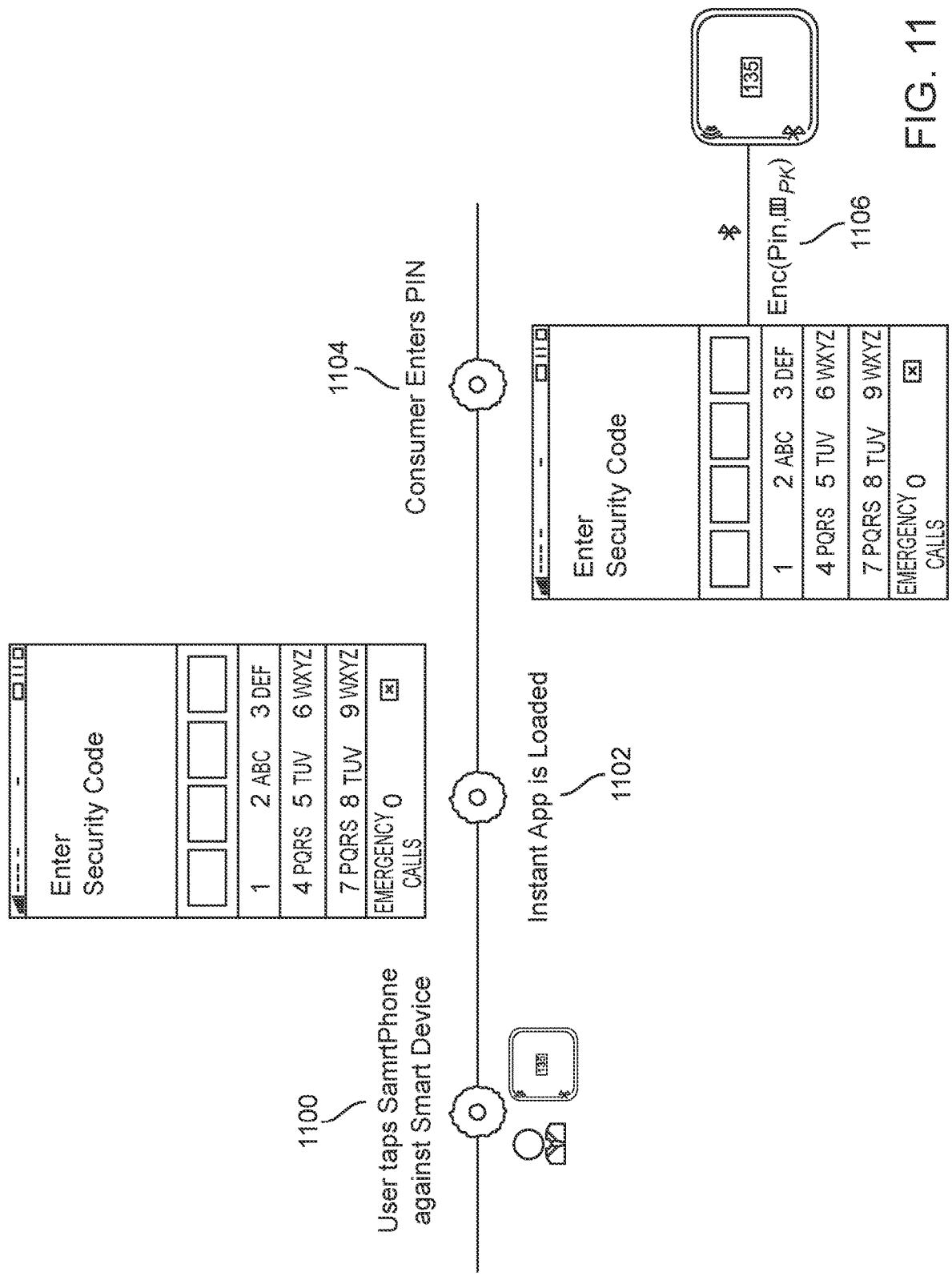
FIG. 11 shows a user verification method according to embodiments of the invention.

As discussed above in connection with FIGS. 8A-8B, the access device may verify the user of the portable device through the smart device. FIG. 11 illustrates an exemplary user verification method according to an embodiment of the invention. The issuer may determine to verify whether or not the correct user is using the portable device 102 at the time of transaction. For example, the issuer may prompt the access device 106 to challenge the user of the portable device 102 to enter a PIN to ensure that the user of the portable device 102 is not using a lost or stolen portable device 102. In some embodiments, the smart device 104 may not include a PIN pad to use during chip and pin transactions. However, the smart device 104 may enable users to enter the PIN using the user's user device, e.g., a smartphone.

According to various embodiments, the need to install an application to a user device (e.g. a smartphone) may be eliminated by using an instant application. At step 1100, the user may first, during the verification phase, tap the user device onto the smart device 104. A browser located on the user device may launch an instant application (InstantApp) using a uniform resource locator (URL) of the issuer stored in the portable device 102. The URL may be transmitted from the portable device 102 to the smart device 104 during any of the previous messages. In some embodiments, the smart device 104 may transmit the URL to the user device when the user device is brought into communication range with the smart device 104, at step 1.

At step 1102, after receiving the URL, the user device may launch the instant application using the URL. The instant application may allow an application to run instantly on the user device if the user device does not have the corresponding application installed. In some embodiments, if the user already has an issuer application of the issuer installed, then the issuer application may be launched.

At step 1103, the user may be prompted to enter the PIN. At step 1104, the user device may then encrypt the PIN using any suitable method. The user device may transmit the encrypted PIN to the smart device 104 via Bluetooth connection.

Recent reports clearly show that fraudsters shifted their focus to e-commerce. Restaurants and hotel setting makes it easy steal payment credentials since consumer is out of sight during payment. Access device 106 breaches makes the situation even worse. Embodiments of the invention provide for smart devices to handle communications between an access device and a portable device that can process authenticated transactions by suspending and resuming the transactions as necessary, as well as enable consumers to pay securely and conveniently. Additionally, embodiments of the invention provided for a solution that is cheaper to deploy and is compatible with existing infrastructure as shown above.

Embodiments of the invention provide for a number of advantages. For example, the user of the portable device does not need to give the portable device to another person that may be a malicious actor. This greatly improves security because the waitstaff may not be able to skim a portable device in front of the user. Additionally, another advantage is that the smart device may be capable of suspending and resuming a transaction. This allows the smart device to communicate with the access device and suspend a transaction until after it has been brought to the portable device to receive additional information, and then brought back to the access device to recover or resume the transaction. Embodiments further prevent waitstaff adding unauthorized tips to the transaction without consumer consent since the portable device is at all times until the transaction is finalized.

Another advantage is the efficient routing of communications in the online setting. The smart devices may efficiently communicate with the access device using other smart devices along an optimized communication pathway.

A further advantage is that the smart device is cost effective and cheaper to employ than placing a point of sale at every table in a restaurant.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a smart device associated with a resource provider, through a network, a first message including data associated with a transaction from an access device associated with the resource provider, wherein the smart device is portable and able to communicate with the access device remotely;
   storing, by the smart device, the data associated with the transaction, wherein the access device suspends the transaction;
   initiating communication, by the smart device with a portable device of a user via near field communication technology;
   transmitting, by the smart device, the data associated with the transaction to the portable device via the near field communication technology;
   receiving, by the smart device via the near field communication technology, a second message including a cryptogram from the portable device, wherein the smart device receives the second message when the smart device is at a distance from the access device of the resource provider and in proximity of the portable device of the user;
   transmitting, by the smart device over the network, a third message including the cryptogram to the access device to resume the transaction; and
   emitting, by the smart device, a signal indicating whether the transaction has been approved or declined in response to receiving a notification from the access device.

2. The method of claim 1, further comprising:
   storing, by the smart device, the cryptogram; and
   sending, by the smart device, a command to resume the transaction to the access device prior to transmitting the cryptogram to the access device, wherein the command includes the data associated with the transaction.

3. The method of claim 2, further comprising:
   receiving, by the smart device from the access device, the notification indicating the transaction being authorized or declined; and
   deleting, by the smart device, the cryptogram upon receiving the indicator from the access device.

4. The method of claim 1, further comprising:
   receiving, by the smart device from the access device, the notification indicating the transaction being authorized or declined; and
   activating, by the smart device, a visual indicator based on the transaction being authorized or declined.

5. The method of claim 1, further comprising:
   initiating, by the smart device, a first communication with the access device via the near field communication technology prior to receiving the first message including the data associated with the transaction from the access device; and
   initiating, by the smart device, a second communication with the access device via the near field communication technology prior to transmitting the third message including the cryptogram to the access device to resume the transaction,
   wherein the smart device receives the data associated with the transaction from the access device and transmits the cryptogram to the access device via the near field communication technology.

6. The method of claim 1, wherein the smart device receives the first message including the data associated with the transaction from the access device and transmits the third message including the cryptogram to the access device via a wireless connection.

7. The method of claim 1, further comprising:
   receiving, by the smart device, the portable device at a reader slot of the smart device; and
   activating a visual indicator after receiving the cryptogram from the portable device.

8. The method of claim 1, wherein data in at least one of the first message, the second message and the third message is exchanged in a plurality of messages.

9. The method of claim 1, wherein the smart device includes a secure element and a pocket configured to receive the portable device.

10. The method of claim 1, further comprising:
    transporting the smart device from a first position to a second position proximate to the portable device, wherein the portable device remains in possession of the user throughout the transaction.

11. The method of claim 1, wherein information is exchanged between the access device and the portable device only through the smart device.

12. A smart device associated with a resource provider comprising:
a processor; and
a non-transitory computer readable medium, the non-transitory computer readable medium comprising code that, when executed by the processor, causes the processor to:
receive, over a network, a first message including data associated with a transaction from an access device associated with the resource provider, herein the smart device is portable and able to communicate with the access device remotely;
store the data associated with the transaction, wherein the access device suspends the transaction;
initiate communication with a portable device of a user via near field communication technology;
transmit the data associated with the transaction to the portable device via the near field communication technology;
receive a second message, via the near field communication technology, including a cryptogram from the portable device, wherein the smart device receives the second message when the smart device is at a distance from the access device of the resource provider and in proximity of the portable device of the user;
transmit, via the network, a third message including the cryptogram to the access device to resume the transaction; and
emit a signal indicating whether the transaction has been approved or declined in response to receiving a notification from the access device.

13. The smart device of claim 12, wherein the code, when executed by the processor, further causes the processor to:
initiate a first communication with the access device via the near field communication technology prior to receiving the first message including the data associated with the transaction from the access device; and
initiate a second communication with the access device via the near field communication technology prior to transmitting the third message including the cryptogram to the access device to resume the transaction,
wherein the smart device receives the data associated with the transaction from the access device and transmits the cryptogram to the access device via the near field communication technology.

14. The smart device of claim 12, further comprising:
a visual indicator,
wherein the code, when executed by the processor, further causes the processor to:
receive the portable device at a reader slot of the smart device; and
activate the visual indicator after receiving the cryptogram from the portable device.

15. The method of claim 1, wherein the access device is a point of sale terminal of the resource provider.

* * * * *